US011662705B2

(12) United States Patent
Girt et al.

(10) Patent No.: US 11,662,705 B2
(45) Date of Patent: May 30, 2023

(54) SMART TOOL SYSTEM, DEVICES, AND METHODS

(71) Applicant: Authentas LLC, Wilmington, DE (US)

(72) Inventors: Benjamin Girt, Murrysville, PA (US); Ed Kuzemchak, New Kensington, PA (US); Frederick William Lamb, Sr., McDonald, PA (US); Frederick William Lamb, II, Carnegie, PA (US)

(73) Assignee: Authentas LLC, Wilmington, DE (US)

( * ) Notice: Subject to any disclaimer, the term of this patent is extended or adjusted under 35 U.S.C. 154(b) by 469 days.

(21) Appl. No.: 16/665,786

(22) Filed: Oct. 28, 2019

(65) Prior Publication Data

US 2020/0133229 A1    Apr. 30, 2020

Related U.S. Application Data

(60) Provisional application No. 62/751,032, filed on Oct. 26, 2018.

(51) Int. Cl.
*G05B 19/4063* (2006.01)
*B25F 5/02* (2006.01)

(52) U.S. Cl.
CPC ............ *G05B 19/4063* (2013.01); *B25F 5/02* (2013.01); *G05B 2219/34191* (2013.01); *G05B 2219/50203* (2013.01)

(58) Field of Classification Search
None
See application file for complete search history.

(56) References Cited

U.S. PATENT DOCUMENTS

| 6,604,013 | B1 | 8/2003 | Hamidieh et al. |
| 6,970,762 | B1 | 11/2005 | Elliott et al. |
| 2005/0000998 | A1* | 1/2005 | Grazioli ............... B25C 1/10 227/10 |
| 2014/0240125 | A1 | 8/2014 | Burch et al. |

OTHER PUBLICATIONS

International Search Report and Written Opinion cited in corresponding International Application No. PCT/US19/58326 dated Mar. 11, 2020.

* cited by examiner

*Primary Examiner* — Sean Shechtman
(74) *Attorney, Agent, or Firm* — Amardeep S. Grewal; Reed Smith LLP

(57) ABSTRACT

A tool monitoring device and method for using a tool monitoring device, the tool monitoring device including a housing configured to couple with an exterior surface of a tool, one or more sensors positioned within the housing and configured to measure one or more properties of the tool over a period of time, a communication interface configured to transmit data from the tool monitoring device to one or more external devices, the transmitted data being generated based at least in part on the measured one or more properties of the tool over the period of time, and a power source configured to provide power to the one or more sensors and the communication interface.

13 Claims, 25 Drawing Sheets

SMART TOOL SYSTEM, DEVICES, AND METHODS

RELATED APPLICATION DATA

This application claims priority to U.S. Provisional Application No. 62/751,032, titled "PNEUMATIC SMART TOOL SYSTEM, DEVICES, AND METHODS" and filed Oct. 26, 2018, the disclosure of which is hereby incorporated by reference in its entirety.

BACKGROUND

Tools for performing construction, engineering, building, and other physical operations include a pneumatic tools, which are air-powered, as well as electrical cordless (battery-powered) and corded tools.

Pneumatic tools, also known as air tools, air-powered tools, or pneumatic-powered tools, are tools driven primarily by compressed air, delivered via a compressed air canister (such as carbon dioxide canister) or via an air compressor. Examples of pneumatic tools include nailguns, staple guns, framing guns, pneumatic pallet nailers, etc.

Non-electric and non-electronic pneumatic tools in industrial and construction applications have traditionally not changed very much since their introduction to the market. These products have not benefited from technological advancements in other industrial and construction tools, due in part to the lack of electrical power driving pneumatic tools.

The absence of electrical power makes diagnostic assessment of pneumatic tool operation and usage difficult, as it is not possible to utilize electricity driven sensors to monitor tool components during usage and operation. This lack of diagnostic assessment, in turn, slows down product development, due to manufacturers and product developers lacking concrete data points on real world usage of pneumatic tools.

Cordless and Corded electric tools, also known as power tools, battery-powered tools, or electric-powered tools, are tools driven primarily by electrical power, delivered via a battery or battery pack (such as a lithium ion or nickel cadmium 18 volt, 20 volt, 60 volt, battery's and other different voltages) or via an electrical line that is plugged into an extension cord or electrical outlet. Examples of cordless and corded tools include drills, hammer drills, compact drill drivers, impact wrenches, grinders, cutters, circular saws, chopsaws, jigsaws, reciprocating saws, nailguns, staple guns, framing guns, nailers, weed wackers, hedge trimmers, chainsaws, lawn mowers, etc.

Diagnostic assessment of cordless and corded electric tools can also be difficult, due in part to not having a power source separate from the cord plugged into an electrical power source such as an outlet, or a power source separate from the main battery attached to the tool. In particular, the process of collecting and sending data from a tool would require constant power being delivered to sensors and data chips on the tool. This could not be achieved in corded electric tools, as they only receive power when a trigger is depressed for a short period of time to create a connection that delivers power only as long as the trigger is depressed before losing that power again when it is released. Additionally, this would be difficult to implement in battery powered tools since users go through different batteries on a single tool or move batteries from tool to tool.

Therefore, current cordless and corded electric tools would only allow for the collection of data when the sensors on board are powered by the operation of the tool. This data collection would clearly lack all the necessary information to perform diagnostic assessment, tracking, and improvement of the tool, tool functions, and tool usage. This lack of live diagnostic assessment, in turn, slows down product development, due to manufacturers and product developers lacking concrete data points on real world usage of cordless and corded tools.

For both pneumatic tools and cordless and corded electrical tools, the lack of diagnostic capabilities results in increased maintenance and repair costs. In most cases, internal defects, improper usage, or malfunctions of a tool will not be detected until after the tool has already broken, resulting in increased repair costs and materials. Additionally, a failure of one component in a tool will sometimes damage other parts of the tool, further compounding repair costs.

Consequently, there is a need for improvements in systems and methods for diagnostic assessment of pneumatically driven tools and cordless and corded electrical tools.

DETAILED DESCRIPTION

Figure 1:
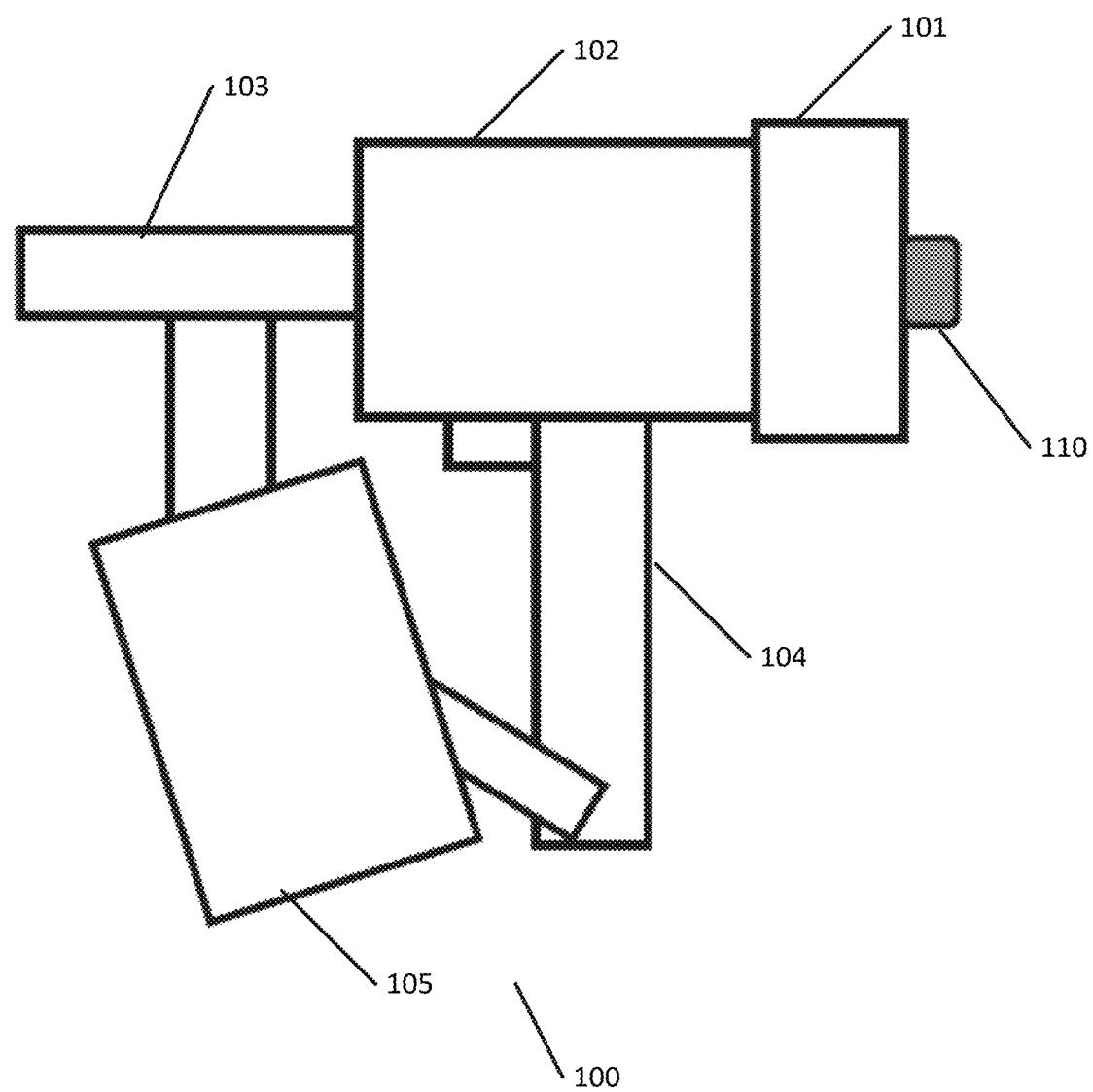
FIG. 1 illustrates a diagram showing the tool monitor attached to a pneumatic tool according to an exemplary embodiment.

While methods, devices, and computer-readable media are described herein by way of examples and embodiments, those skilled in the art recognize that the smart tool system, devices, and methods are not limited to the embodiments or drawings described. It should be understood that the drawings and description are not intended to be limited to the particular form disclosed. Rather, the intention is to cover all modifications, equivalents and alternatives falling within the spirit and scope of the claims. Any headings used herein are for organizational purposes only and are not meant to limit the scope of the description. As used herein, the word "can" is used in a permissive sense (i.e., meaning having the potential to) rather than the mandatory sense (i.e., meaning must). Similarly, the words "include," "including," and "includes" mean including, but not limited to.

As discussed above, improvements are needed in systems and methods for diagnostic assessment, monitoring, and management of tools. Applicant has discovered novel systems, devices, and methods that allow for diagnostic assessment, monitoring, and management of tool operation, usage, and component condition. As used herein, the term tool includes, but is not limited to, pneumatically driven tools (referred to as "pneumatic tools"), cordless (battery-powered) electrical tools and corded tools (referred to as "electric power tools"), and non-electrical and non-pneumatically powered tools, such as tools that derive power from internal combustion of hydrocarbons.

In particular, Applicant has developed a smart tool system, tool monitor, tool diagnostic data mining methods, and live data transfer capabilities that can be utilized to diagnostically assess tool usage, tool development, tool maintenance, part and tool development, sales support, logistics support, user training, safety training, warning systems, replenishment programs, data delivery, anti-theft, location services, warranty management, advertising services, and a variety of other scenarios, as discussed below.

A tool monitoring device is disclosed herein. The tool monitoring device includes a housing configured to couple with an exterior surface of a tool, one or more sensors positioned within the housing and configured to measure one or more properties of the tool over a period of time, a communication interface configured to transmit data from the tool monitoring device to one or more external devices, the transmitted data being generated based at least in part on the measured one or more properties of the tool over the period of time, and a power source configured to provide power to the one or more sensors and the communication interface.

The tool can be pneumatically powered tool or electrically powered tool, in which case the power source for the tool monitor can be independent of a second power source that is configured to power the tool.

The housing of the tool monitor can be configured to couple with the exterior surface of the tool at a plurality of attachment points. The methods for coupling are discussed in greater detail below and can be permanent or removable couplings.

Each of the one or more properties of the tool that are measured by the sensors can be either electromagnetic properties (such magnetic field, current, voltage, etc.) and/or a physical property (pressure, sound, movement, acceleration, etc.).

The tool monitoring device can include one or more controllers configured to generate one or more data signatures based at least in part on the one or more measured properties. The controllers can each include one or more processors coupled to one or more memories (which can be any kind of memory, such as flash memory) and one or more instructions stored on the memories that execute on the processors and cause the tool monitoring device to perform the data signature generation and other disclosed functionality.

The one or more controllers can further be configured to compare at least one generated data signature in the one or more generated data signatures to one or more stored data signatures and generate a diagnostic assessment based at least in part on the comparison. As will be discussed in greater detail below, the diagnostic assessment can relate to the tool, tool usage, tool user, tool age, tool wear, etc.

The one or more controllers can further be configured to transmit location data indicating a location of attachment of the tool monitoring device on the tool. The location data can also be used when generating a data signature, comparing a generated data signature (for example, by selecting comparison signatures that have the same location of attachment), and/or generating a diagnostic assessment, whether this process is performed by the controllers or by a cloud system (discussed further below).

The sensors can include, for example, an audio sensor, an accelerometer, an inertial measurement unit (IMU) sensor, a pressure sensor, a barometric sensor, an electrical current sensor, a voltage sensor, a hall effect sensor, an electromagnetic sensor, and/or a temperature sensor.

The one or more external devices that receive the data can be cloud servers, data centers, end-user devices, or any other computing device that is configured to utilize the sensor data.

The communication interface can be a cellular communications interface. In this case, the communication interface can be configured to transmit data from the tool monitoring device directly to the one or more cloud servers.

The communication interface can also be a wireless communications interface, an infrared interface, a Bluetooth interface, a near-field communications interface, or a radio frequency interface. As is discussed further below, the communication interface can be configured to transmit data from the tool monitoring device to one or more cloud servers via a gateway device disposed between the tool monitoring device and the one or more cloud servers.

Applicants have also discovered a method executed by one or more computing devices, an apparatus, and a computer-readable medium for performing a diagnostic assessment based on one or more properties of a tool over a period of time and using a tool monitoring device as discussed above.

The method includes receiving data from the tool monitoring device that is coupled to the tool, the received data being generated based at least in part on measurements of one or more properties of the tool captured over the period of time by one or more sensors of the tool monitoring device.

The method also includes generating one or more data signatures based at least in part on the one or more measured properties and comparing at least one generated data signature in the one or more generated data signatures to one or more stored data signatures corresponding to one or more diagnostic outcomes.

The method further includes generating a diagnostic assessment based at least in part on the comparison. As explained above, this diagnostic assessment can include assessments related to the tool, tool usage, tool user, tool age, tool wear, etc.

As discussed previously, the one or more sensors of the monitoring device can include one or more of: an audio sensor, an accelerometer, an inertial measurement unit (IMU) sensor, a pressure sensor, a barometric sensor, an electrical current sensor, a voltage sensor, a hall effect sensor, an electromagnetic sensor, or a temperature sensor.

The smart tool system includes a tool monitor device ("tool monitor"). The tool monitor is a highly developed independent electronic board of specialized sensors built for accumulating information and data on traditionally non-electric and non-electronic compression actuated, compressor dependent, compression driven tools, motor driven electrically power tools, and/or other types of tools, such as internal combustion driven tools. Tool monitor can include, for example, electronic chip(s), electronic circuit board(s), and an external housing. Tool monitor can additionally include specialized sensors, including accelerometers, inertial measurement unit (IMU) sensors, global positioning satellite (GPS) sensors, antenna(s), and location hardware, and pressure and barometric sensors. The tool monitor can further include one or more processors or processing units, volatile or non-volatile memory, storage drives or disks (such as flash memory), and communications interfaces, such as a wireless internet card or chip, a cellular network interface, or one or more communications ports (such as a universal serial bus port). The tool monitor can be part of a low power wide area network (LPWAN) used to transmit the collected sensor data.

Additional examples of sensors that can be integrated into the tool monitor include: a microphone or other audio sensor to detect tool and fastener usage, to generate waveforms for identifying tool usage, and measuring pneumatic pressure, pressure, and electrical profiles; barometric sensors to measure pressure changes in the tool and atmosphere; times and/or counters to capture interrupt times of the accelerometer and comparator outputs in the tools; power harvesting and power generating sensors for charging the independent tool monitor battery; electromagnetic sensors including Hall effect sensors, magneto-diode sensors, magneto-transistor sensors, anisotropic magnetoresistance sensors, magnetometers, giant magnetoresistance magnetometers, magnetic tunnel junction magnetometers, magneto-optical sensors, Lorentz force based microelectromechanical systems sensors, Electron Tunneling based microelectromechanical systems sensors, etc.; and/or temperature sensors to identify tool and part performances at different temperatures.

The tool monitor can be powered by onboard batteries, such as lithium ion or other rechargeable batteries, disposable batteries, and/or by a power outlet via a power cable and power interface on the tool monitor. The tool monitor can also be powered by the motion of the tool parts itself, whether it is a pneumatic tool, electrically powered, or gas-powered. For a pneumatic tool, the tool monitor can include an electrical generator that is coupled to a motor within the tool to utilize part of the force generated by the compressed air to power the tool monitor. For an electrically powered tool, the tool monitor can include an electrical generator that is coupled to the electrical motor and/or mechanical power driven mechanisms within the tool to utilize part of the force generated by the motion to power the tool monitor. The electrical generator within the tool monitor can also be powered by the motion of a tool as well. For example, the force or recoil produced when using a tool can be harnessed and converted into electricity to power the tool monitor.

The tool monitor can include a number of power-saving features. The tool monitor includes sensors with low power consumption design and architecture to gather data on the tool. The tool monitor can also store collected data in small amounts for reduced data rates and power consumption during transfer. The tool monitor can additionally generate an interrupt via the accelerometer to begin a capture thread for the purposes of reduced power consumption in the tool monitor power source. The capture thread can be blocked via a semaphore until an interrupt occurs to prevent excess power consumption. This hibernate or sleep functionality is described in greater detail below.

The smart tool system additionally includes analytical software configured to analyze data collected by the tool monitor, generate data signatures, and utilize the data signatures to perform a variety of diagnostic, maintenance, product development, advertising, safety assessment, warranty management, user training, warning, user notifications, and/or tool usage related analysis.

The analytical software can optionally be integrated into the tool monitor, such as on a computer-readable medium storing instructions that are executed by one or more processors of the tool monitor.

The analytical software can also be stored external to the tool monitor device, for example, on a remote computing device. In this case, the tool monitor can gather sensor data on tool usage and operation and pass the gathered information, via a communications interface, and/or via a direct link to the cloud in a gatewayless fashion, to the remote computing device for analysis.

The analytical software can optionally be partitioned or distributed such that some processing tasks are performed on the tool monitor and other processing tasks are performed on a remote computing device. For example, the tool monitor can store and execute software that generates data signatures based on sensor data gathered by the tool monitor. The generated data signatures can then be passed to the remote computing device or cloud, as outlined above, for further analysis and processing.

FIGS. 1-9 illustrate the tool monitor on a pneumatic tool according to an exemplary embodiment. FIG. 1 illustrates a diagram showing the tool monitor 110 attached to a pneumatic tool 100. Tool 100 can be any pneumatic tool, such as a nailgun, staple gun, framing gun, and/or pneumatic pallet nailer. Tool 100 includes a tool cap 101, a tool housing 102 that houses a piston that drives a projectile (such as a fastener), a tool handle 104 for gripping the tool and/or providing the airflow to the tool housing, a tool nose 103 or barrel for directing the projectile, and a tool magazine 105 to hold the projectiles prior to ejection. As shown in FIG. 1, the tool monitor 110 can be placed on the cap 101 of the tool 100 for the purpose of aligning with the center of force generated.

Depending on the diagnostic assessment required, the tool monitor 110 can be permanently or removably affixed to a different locations on the tool 100. For example, the tool 100 can be manufactured or designed to couple with the tool monitor 110 at predetermined attachment points. The tool monitor 110 can then be permanently or removably coupled to the tool 100 at those points. For example, the tool 100 can include threads in multiple locations that are configured to mate with corresponding threads on the tool monitor 110.

For the purposes of analysis of tool usage, the location of the tool monitor 110 on the tool 100 can be either detected, based upon sensor readings resulting from tool usage, input by a user to the analytical software, and/or otherwise be stored in a memory of a device that is performing tool usage and operation diagnostic analysis. For example, the sensors (including the accelerometer and the pressure sensors) of the tool monitor 110 will produce different signatures depending upon where the tool monitor 110 is located on the tool 100. These signatures can be compared to signatures associated with known tool monitor 110 locations (which can be part of an initial training data set or calibration process) to determine the location of the tool monitor 110 on the tool 100.

As discussed above, the tool monitor 110 can be located at different points on the tool 100 based upon the specific diagnostic assessment being performed. FIGS. 2-8 illustrate examples of additional placement points of the tool monitor 110 on the tool 100.

Figure 2:
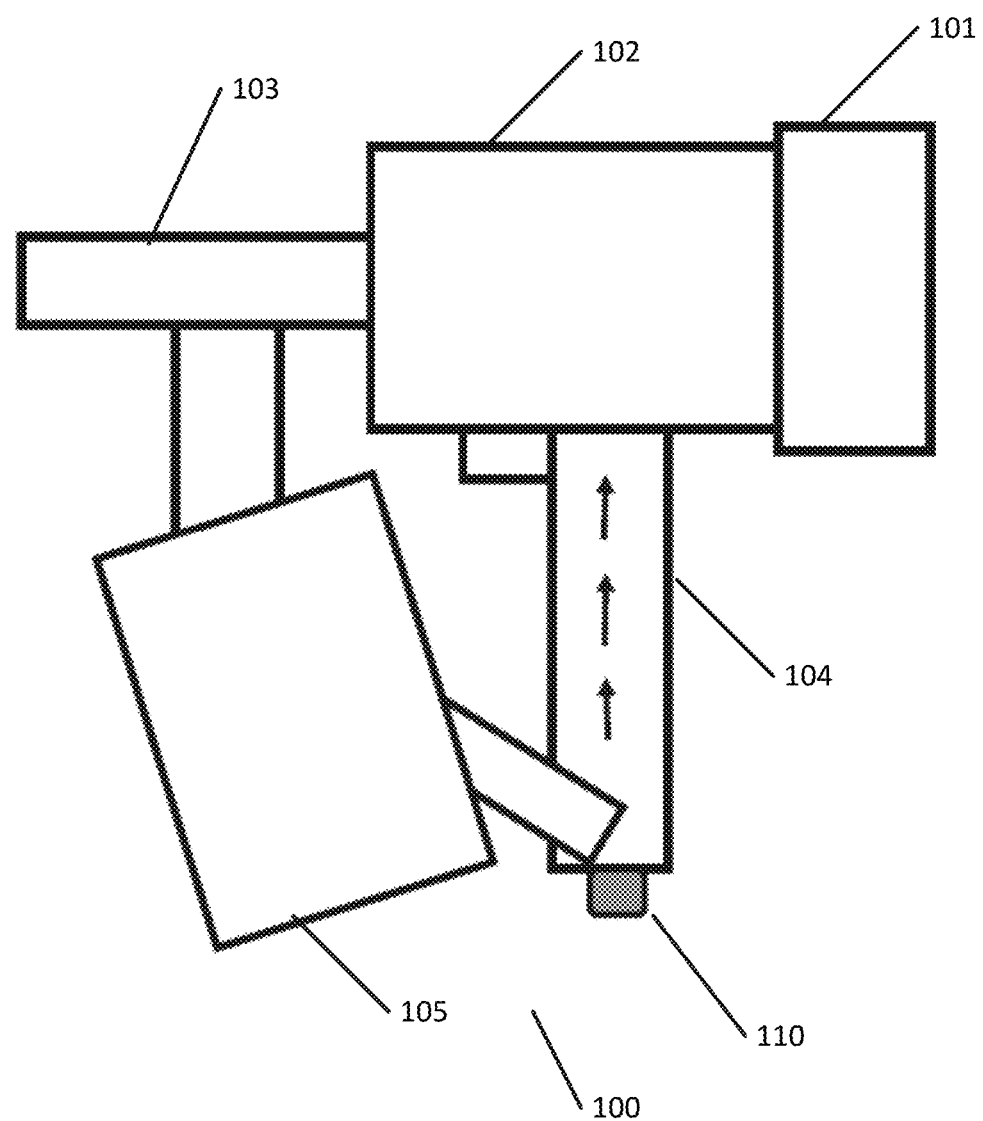
FIG. 2 illustrates the tool monitor attached to a portion of the tool handle according to an exemplary embodiment.

FIG. 2 illustrates the tool monitor 110 attached to a portion of the tool handle 104. As shown in FIG. 2, the tool monitor 110 can be placed so that an axis of the accelerometer within the tool monitor 110 is aligned with the air flow in the handle. This allows measurement of the g-force (i.e., acceleration as measured in units of the gravitational acceleration caused by earth's gravity) generated when the compressed air is passed through the handle.

The small design of the tool monitor requires minimal modification to pneumatic tools and does not interfere with the normal use of pneumatic tools. Additionally, the tool monitor can include a ruggedized and waterproof structure for extended use in industrial environments. Furthermore, the wireless design of the tool monitor does not require the pneumatic tools to be taken apart for the collection and sending of the sensor data.

Figure 3:
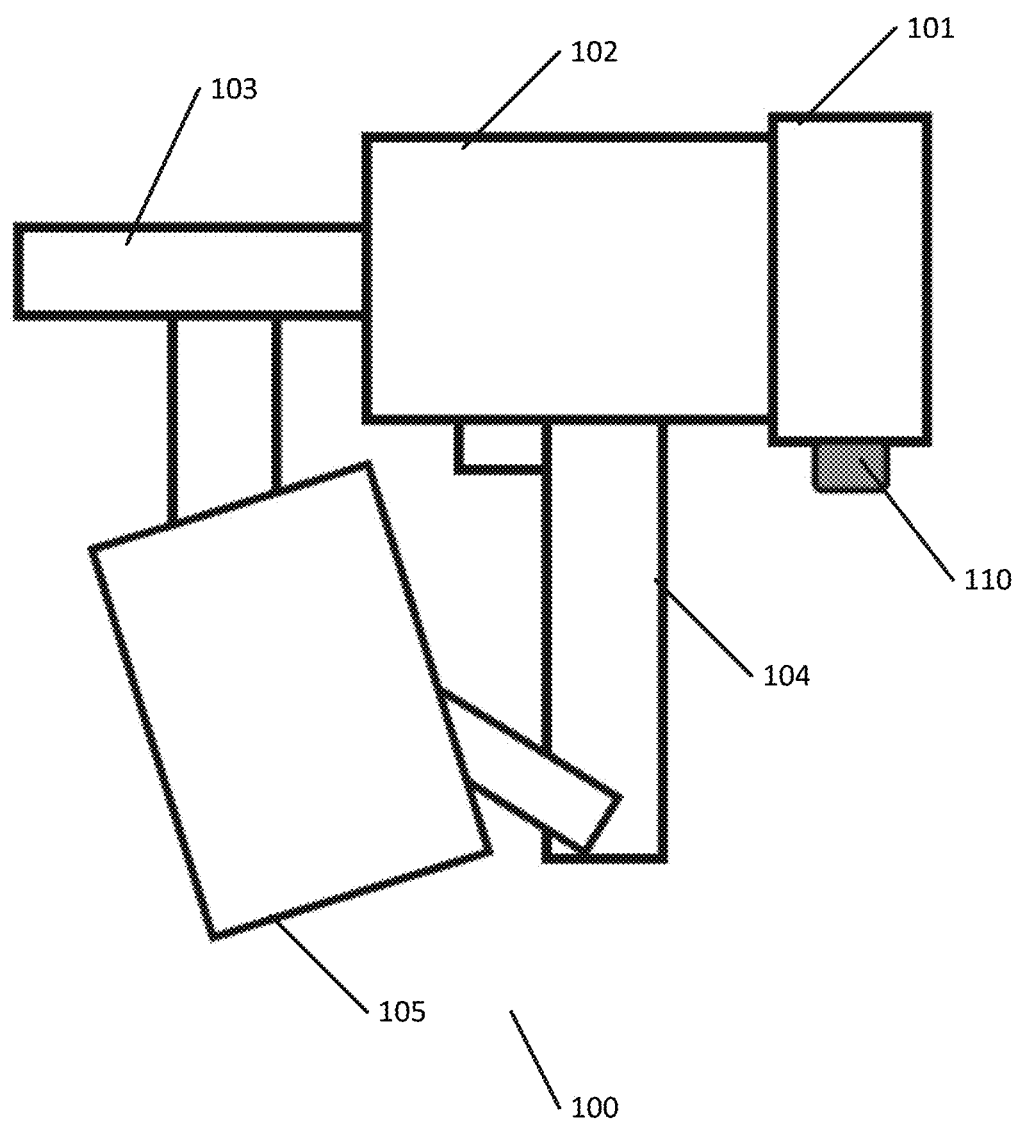
FIGS. 3-4 illustrate the tool monitor attached to different portions of the tool cap according to an exemplary embodiment.
Figure 4:
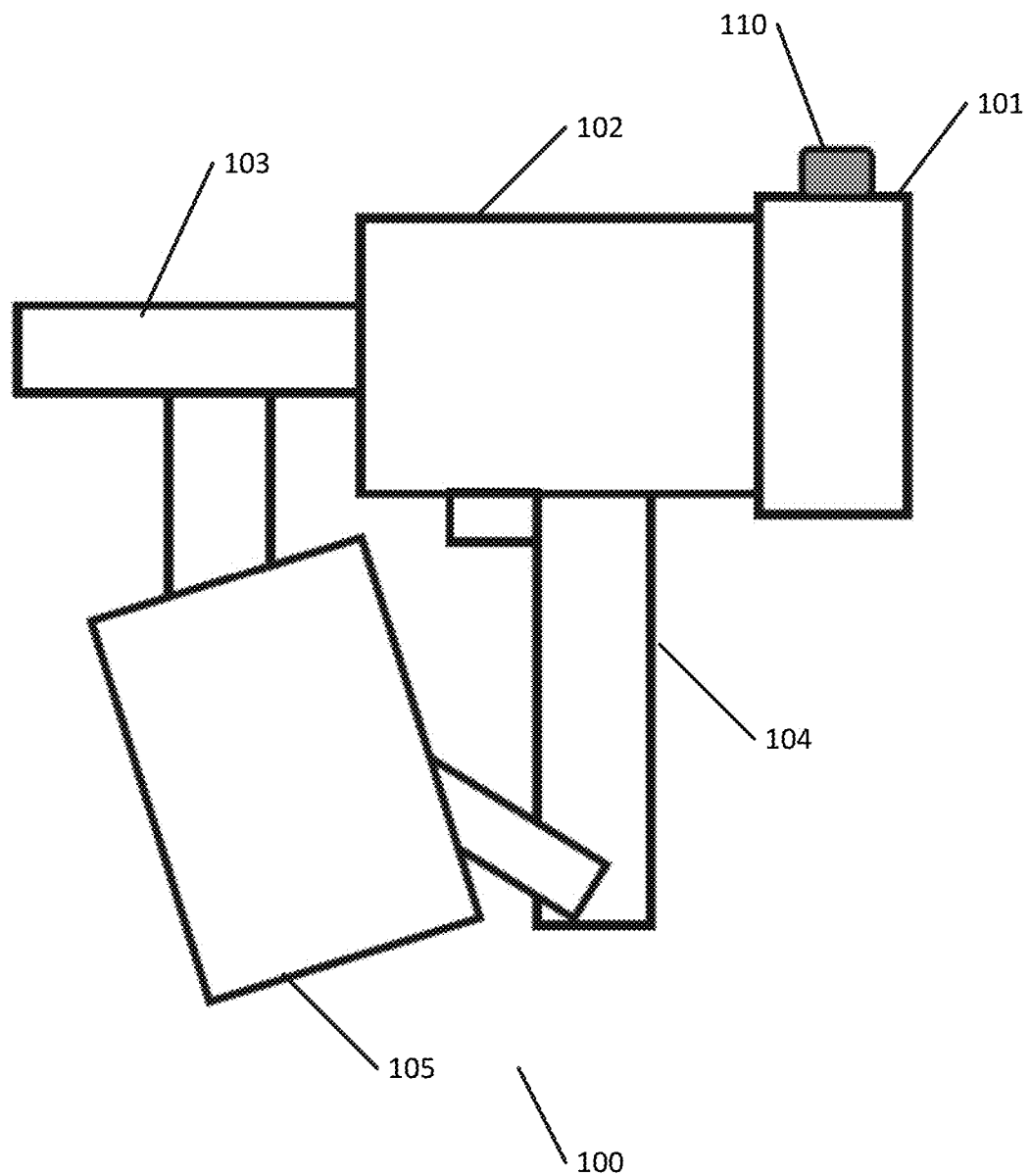
Figure 5:
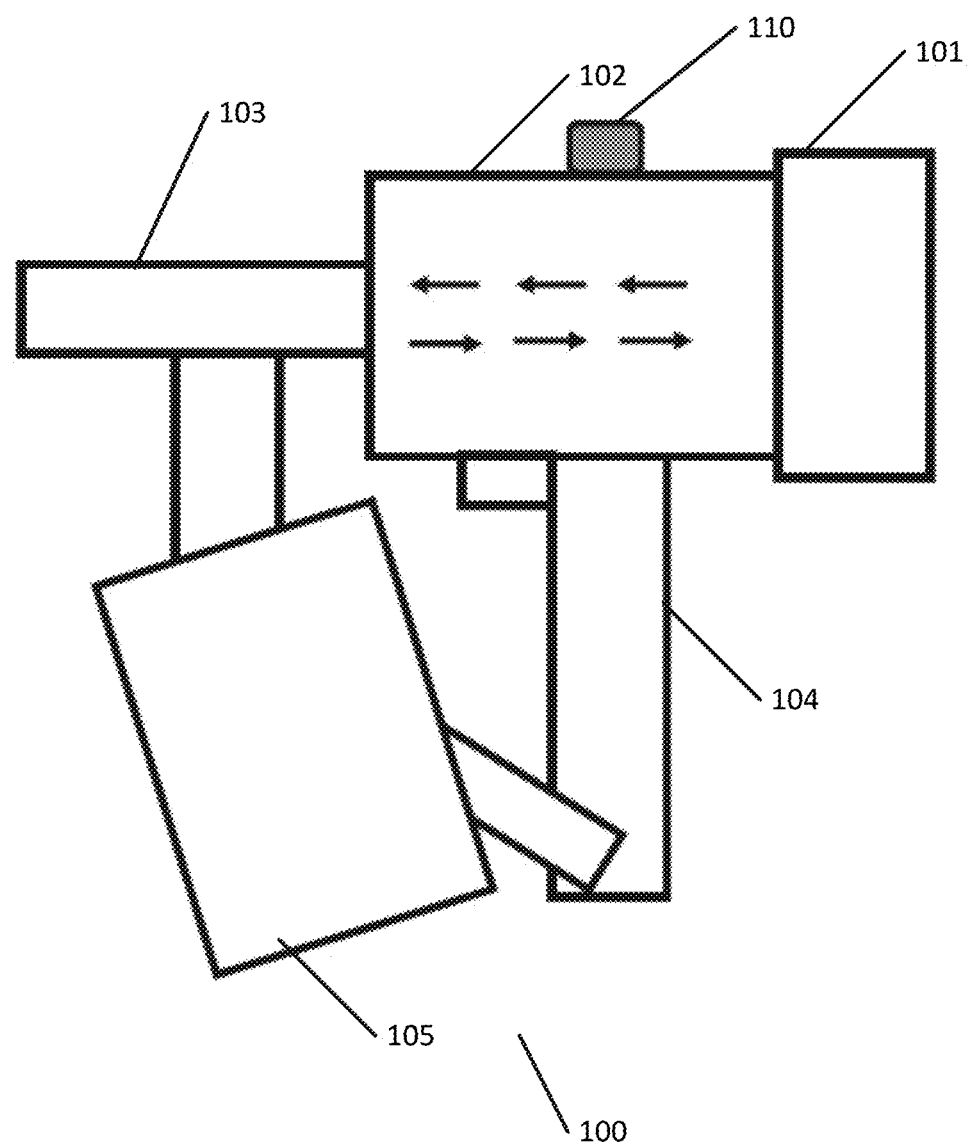
FIG. 5 illustrates the tool monitor attached to the tool housing such that the axis of the accelerometer within the tool monitor is aligned with the direction of airflow within the tool housing according to an exemplary embodiment.

FIGS. 3-4 illustrates the tool monitor 110 attached to different portions of the tool cap 101. FIG. 5 illustrates the tool monitor 110 attached to the tool housing 102 such that the axis of the accelerometer within the tool monitor 110 is aligned with the direction of airflow within the tool housing 102. This allows measurement of the g-force generated when the compressed air is passed through the tool housing 102.

Figure 6:
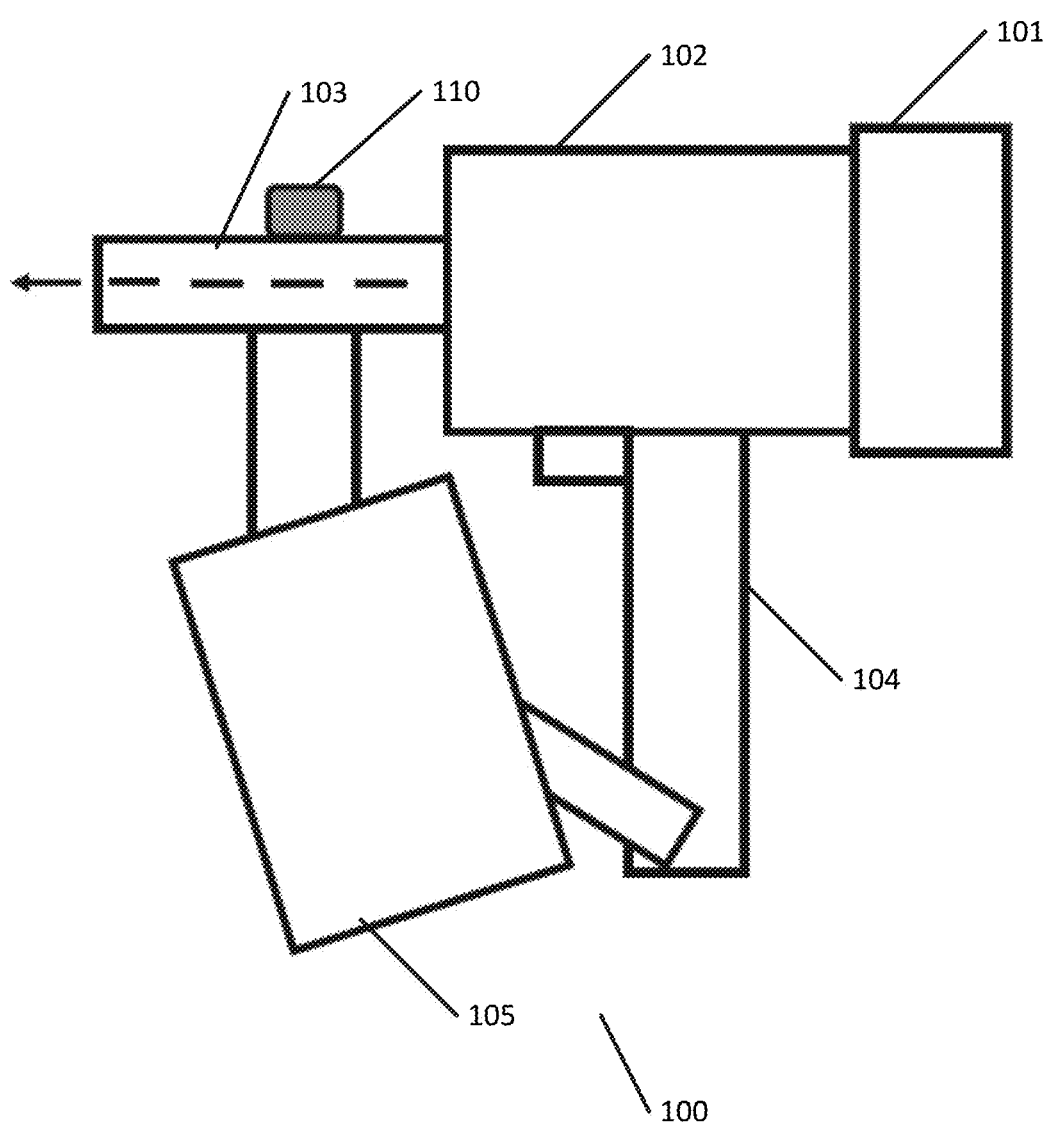
FIG. 6 illustrates the tool monitor attached to the tool nose such that the axis of the accelerometer within the tool monitor is aligned with the driving direction of projectiles from the tool nose according to an exemplary embodiment.

FIG. 6 illustrates the tool monitor 110 attached to the tool nose 103 such that the axis of the accelerometer within the tool monitor 110 is aligned with the driving direction of projectiles from the tool nose 103. This allows for the measurement of g-forces in the tool nose 103 resulting from the ejection of the projectiles and closeness to impact of the projectile in the material.

Figure 7:
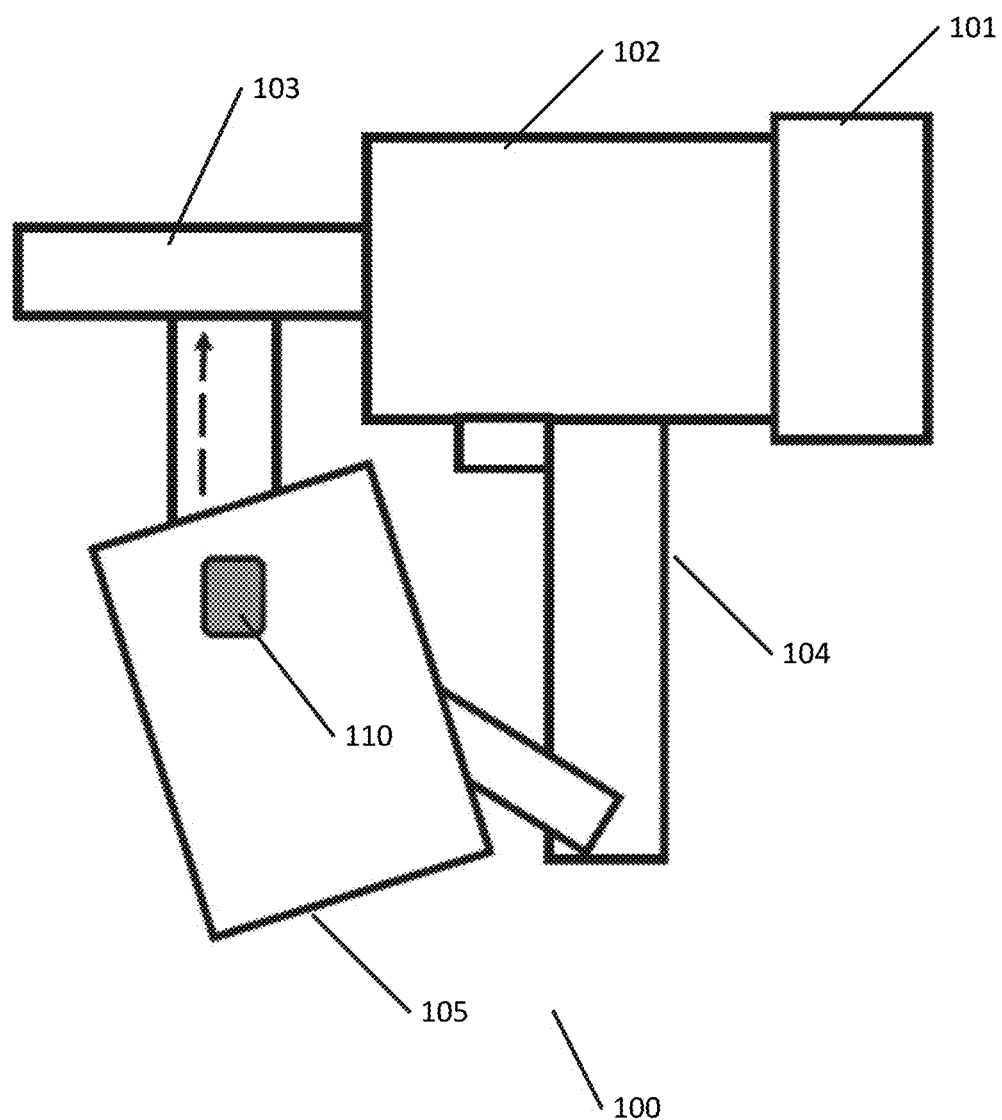
FIG. 7 illustrates the tool monitor attached to the tool magazine such that the axis of the accelerometer within the tool monitor is aligned with the feeding direction of projectiles from the tool magazine according to an exemplary embodiment.

FIG. 7 illustrates the tool monitor 110 attached to the tool magazine 105 such that the axis of the accelerometer within the tool monitor 110 is aligned with the feeding direction of projectiles from the tool magazine 105. This allows for measurement of g-forces in the tool magazine 105 resulting from feeding the projectiles to the tool nose 103.

Figure 8:
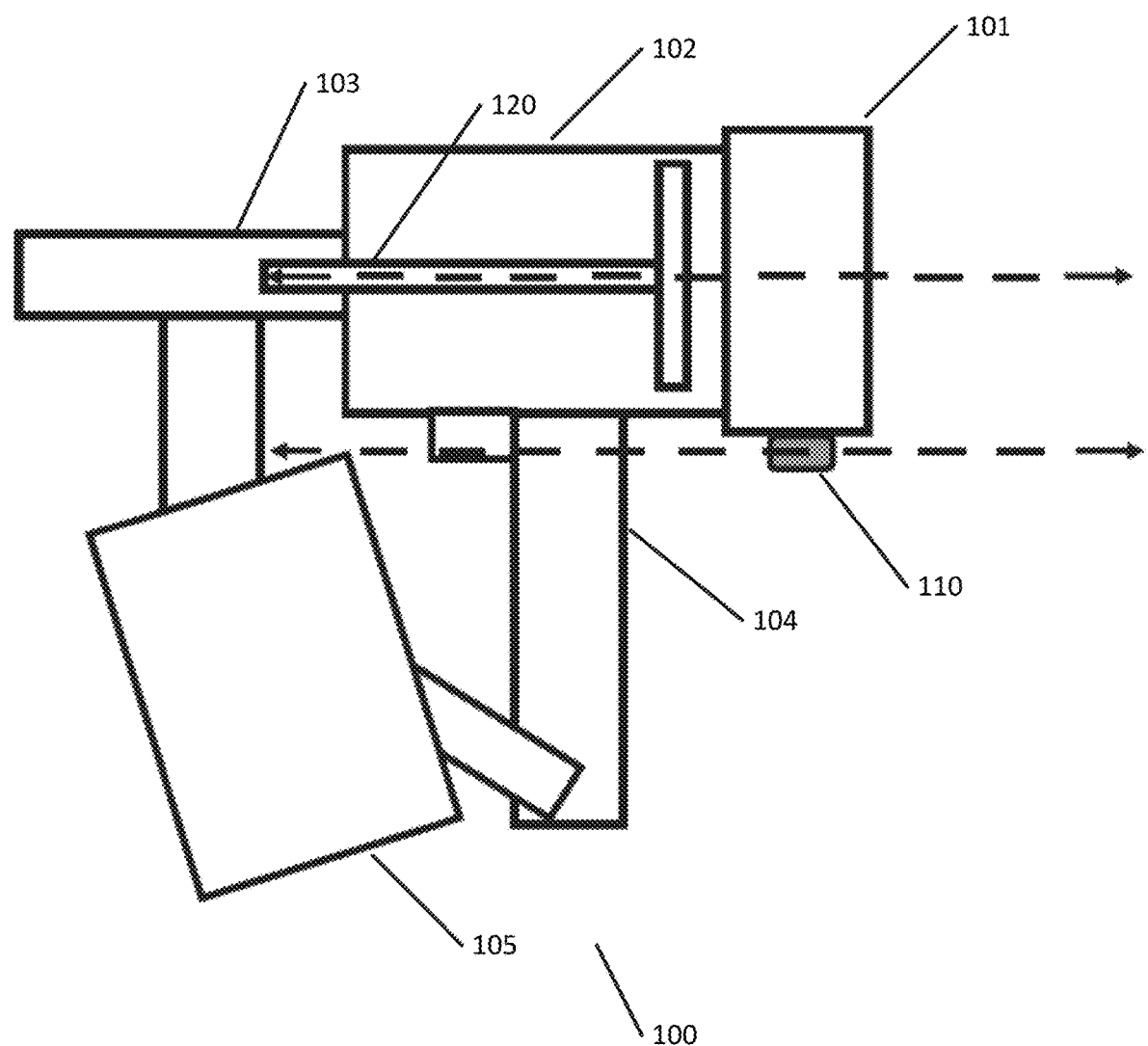
FIG. 8 illustrates the tool monitor attached to the tool cap such that the axis of the accelerometer within the tool monitor is aligned with the driving force of the tool and the piston driver within the tool housing according to an exemplary embodiment.

FIG. 8 illustrates the tool monitor 110 attached to the tool cap 101 such that the axis of the accelerometer within the tool monitor 110 is aligned with the driving force of the tool and the piston driver 120 within the tool housing 102. Again, this allows for measurement of g-forces in the tool cap 101 resulting from the motion of the piston driver 120.

Figure 9:
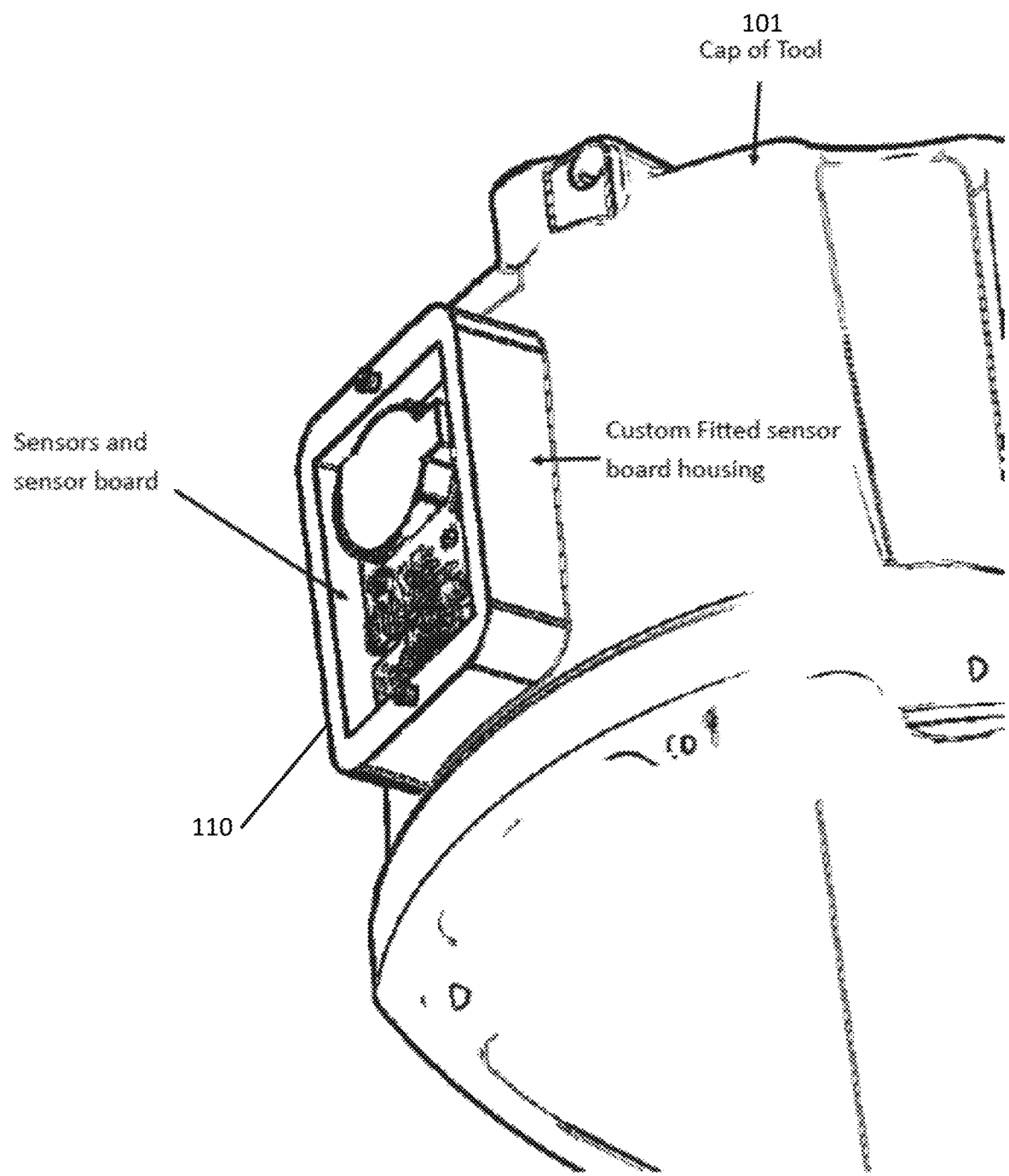
FIG. 9 is a perspective drawing of the tool monitor placed on the tool cap according to an exemplary embodiment.

FIG. 9 is a perspective drawing of the tool monitor 110 placed on the tool cap 101. As shown in FIG. 9, the tool monitor 110 can include one or more sensors and/or a sensor board, as well as a custom fitted sensor board housing. As shown in the figure, the tool monitor can have a through hole port design that allows for the fitting of a pressure sensor and barometric sensor.

Figure 10:
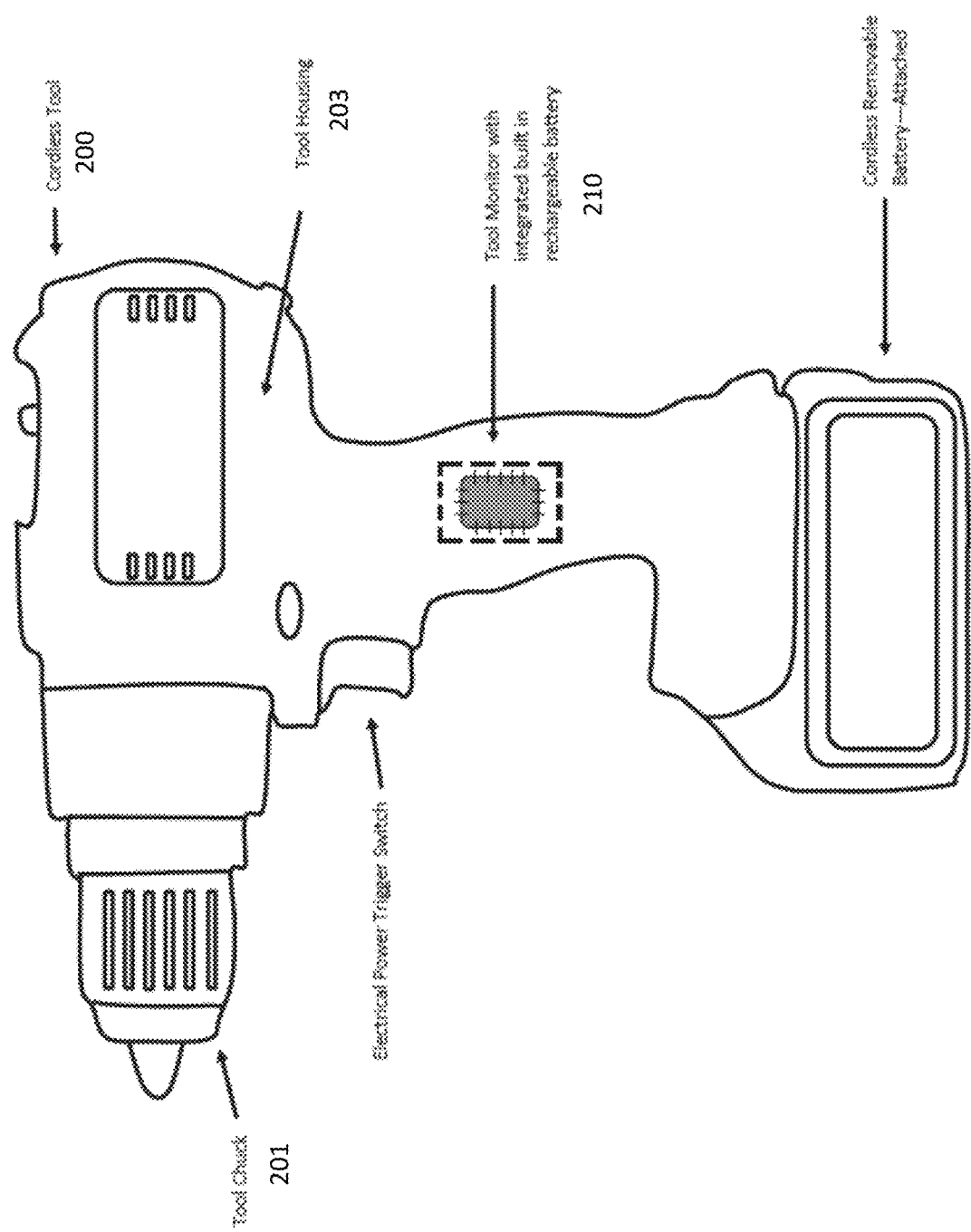
FIGS. 10-11 illustrates a diagram showing a tool monitor attached to a cordless tool according to an exemplary embodiment.
Figure 11:
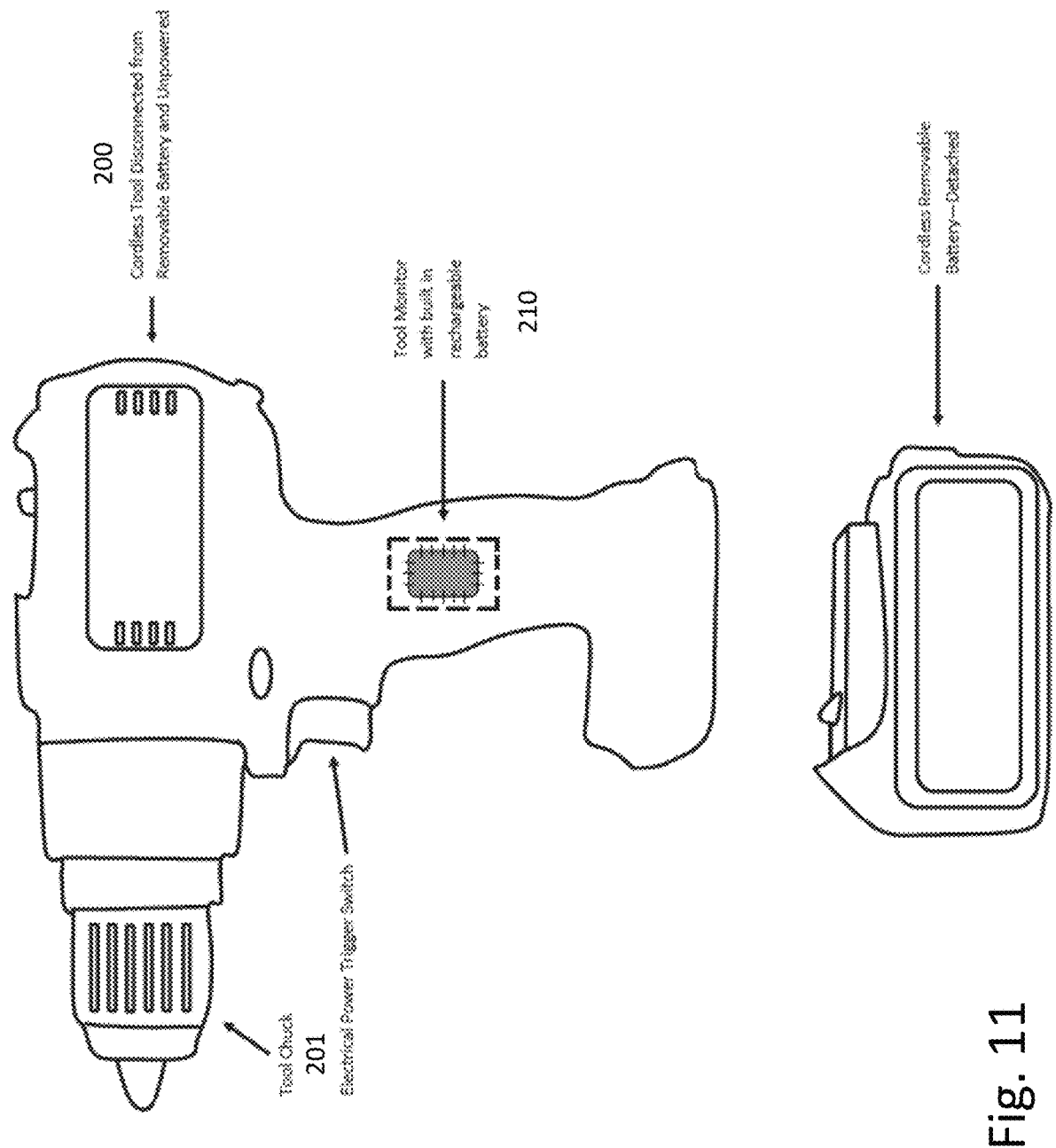

FIGS. 10-11 illustrates a diagram showing a tool monitor 210 attached to a cordless tool 200. Tool 200 can be any cordless tool, such as drills, hammer drills, compact drill drivers, impact wrenches, circular saws, chopsaws, jigsaws, reciprocating saws, nailguns, staple guns, framing guns, nailers, staplers, leaf blowers, weed wackers, hedge trimmers, chainsaws, lawn mowers, etc. Cordless Tool 200 includes a tool chuck 201, a tool housing 202 that houses an Electrical Motor and Switch Assembly that drives a multitude of mechanical solutions such as gearboxes and clutches, or attachments (such as a bit or blade). As shown in FIGS. 10-11, the tool monitor 210 can be placed on the tool housing 202 for the purpose of aligning with the forces generated, and ease of connection of the tool monitor 210 to power sources.

Depending on the diagnostic assessment required, the tool monitor 210 can be permanently or removably affixed to different locations on the tool 200. For example, the tool 200 can be manufactured or designed to couple with the tool monitor 210 at predetermined attachment points. The tool monitor 210 can then be permanently or removably coupled to the tool 200 at those points. For example, the tool 200 can include threads, snaps, wires, or connectors in multiple locations that are configured to mate with corresponding threads, snaps, wires, or connectors on the tool monitor 210.

For the purposes of analysis of tool usage, the location of the tool monitor 210 on the tool 200 can be either detected, based upon sensor readings resulting from tool usage, input by a user to the analytical software, and/or otherwise be stored in a memory of a device that is performing tool usage and operation diagnostic analysis. For example, the sensors (including the accelerometer, pressure sensors, and the electrical sensors) of the tool monitor 210 will produce different signatures depending upon where the tool monitor 210 is located on the tool 210. These signatures can be compared to signatures associated with known tool monitor 210 locations (which can be part of an initial training data set or calibration process) to determine the location of the tool monitor 210 on the tool 200.

Figure 12:
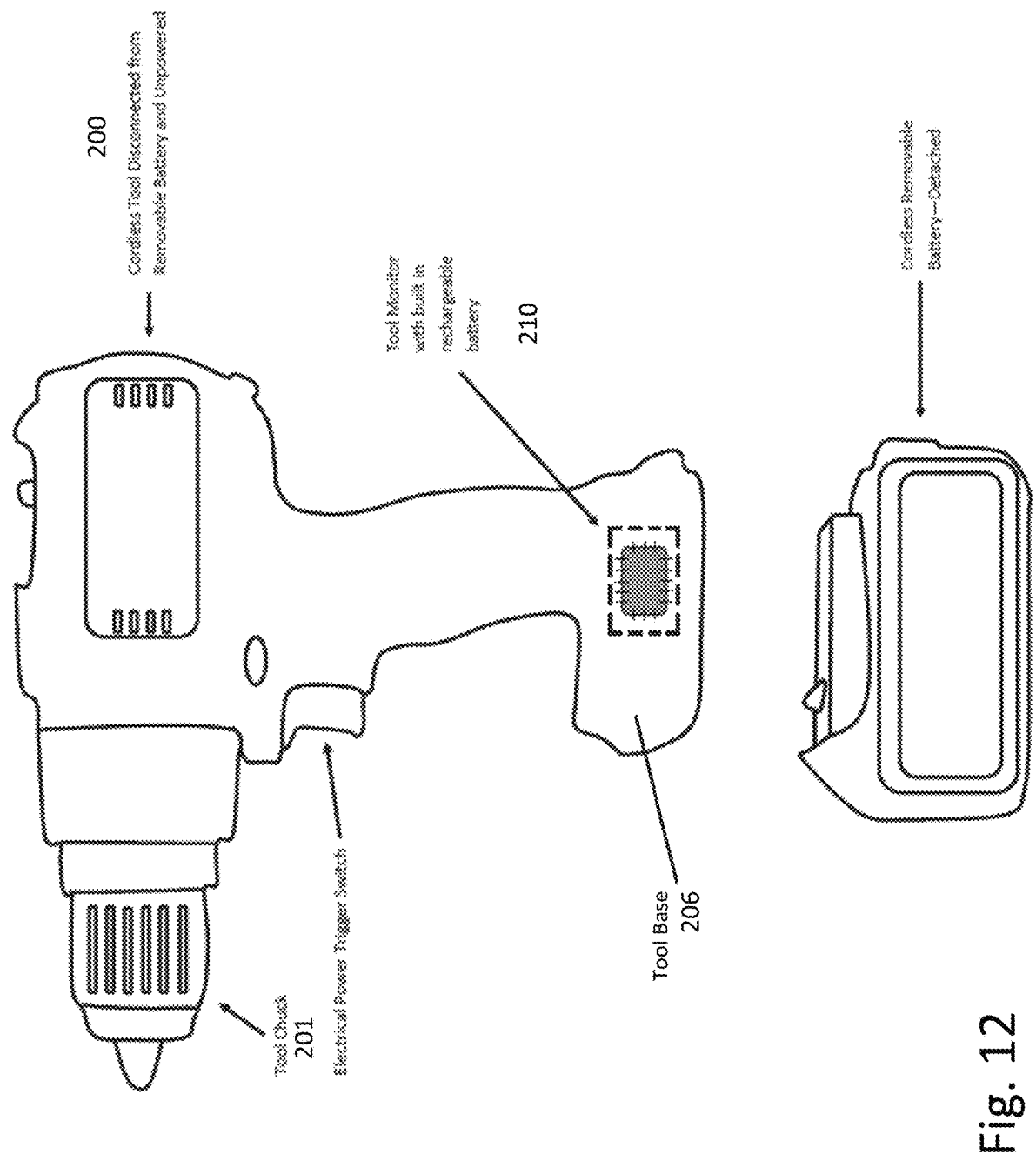
FIG. 12 illustrates the tool monitor attached to the tool base such that the sensors within the tool monitor are aligned with the electrical contact connector and battery or power source of the tool according to an exemplary embodiment.
Figure 13:
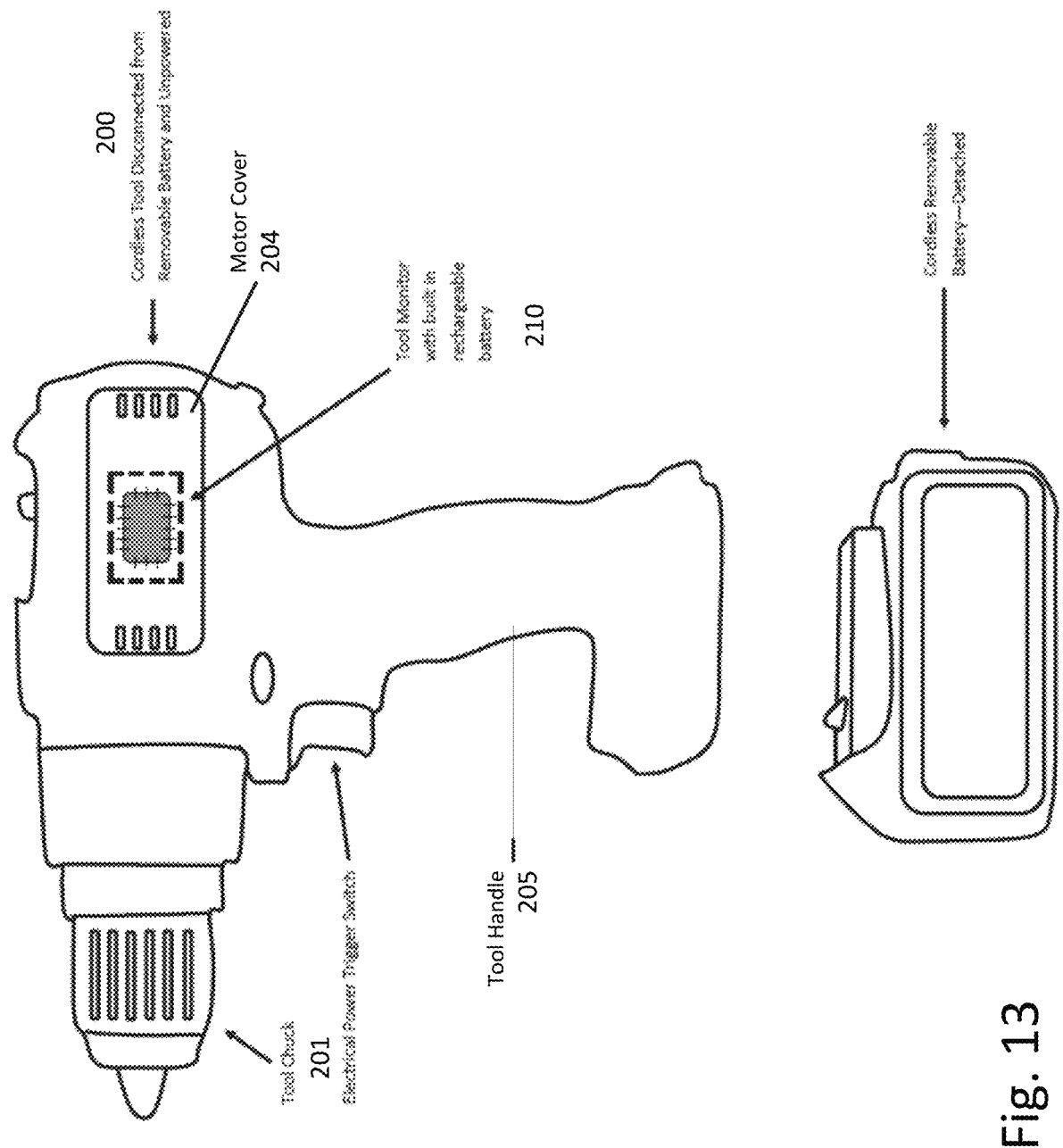
FIG. 13 illustrates the tool monitor attached to the tool motor cover such that the axis of the accelerometer within the tool monitor is aligned with the feeding direction of the chuck and tool driving direction and in line from the tool handle where the users grip rests according to an exemplary embodiment.
Figure 14:
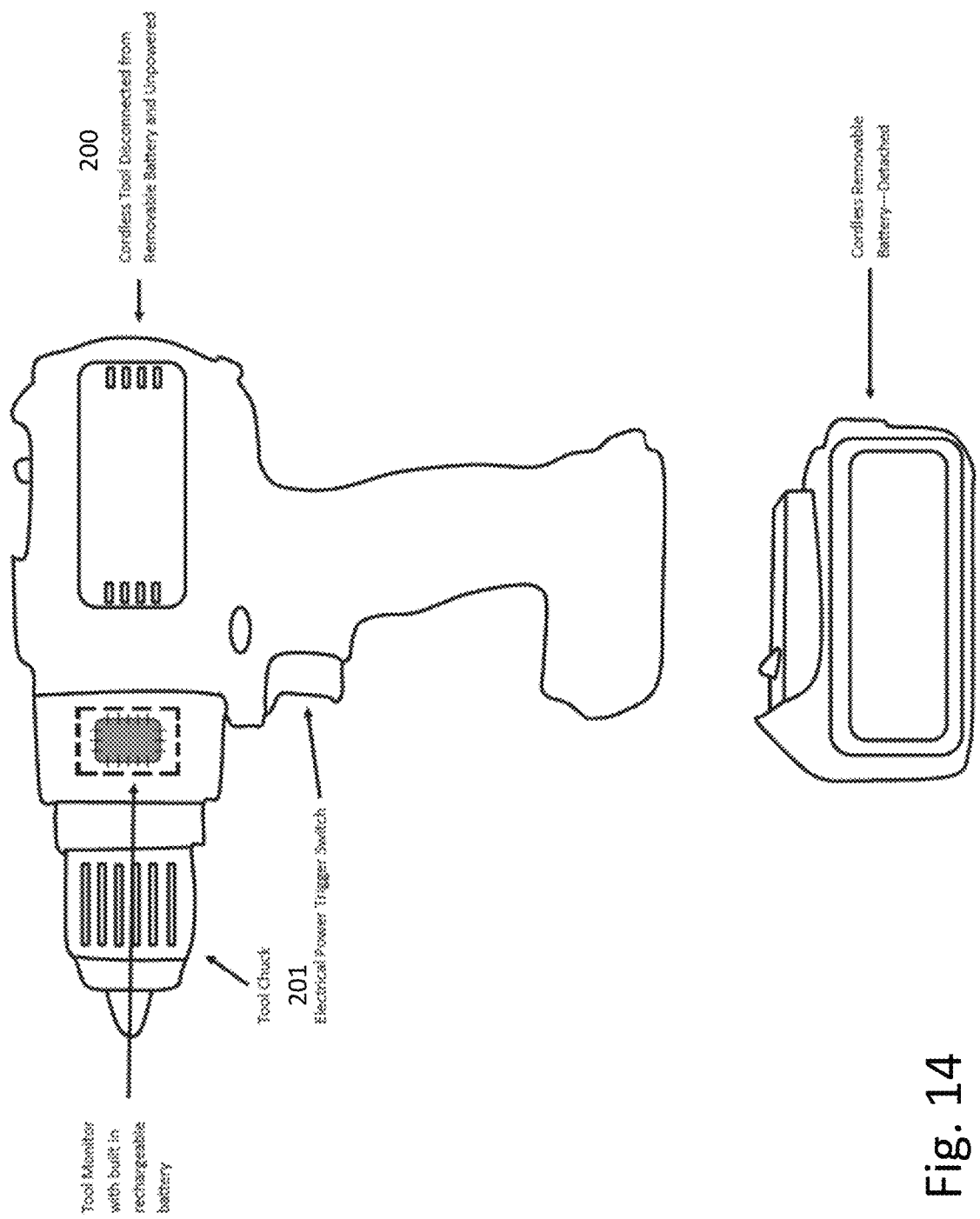
FIG. 14 illustrates the tool monitor attached to the tool chuck such that the axis of the accelerometer within the tool monitor is aligned with the rotating driving direction of the tool chuck according to an exemplary embodiment.

As discussed above, the tool monitor 210 can be located at different points on the tool 200 based upon the specific diagnostic assessment being performed. FIGS. 12-14 illustrate examples of additional placement points of the tool monitor 210 on the tool 200.

FIG. 12 illustrates the tool monitor 210 attached to the tool base 206 such that the sensors within the tool monitor 210 are aligned with the electrical contact connector and battery or power source of the tool 200. This allows for measurement and management of electrical usage in the tool, as well as collection of power for the powering of sensors and for the charging of the integrated rechargeable battery, supercapacitor(s), and/or capacitor(s) in the tool monitor 210.

FIG. 13 illustrates the tool monitor 210 attached to the tool motor cover 204 such that the axis of the accelerometer within the tool monitor 210 is aligned with the feeding direction of the chuck 201 and tool driving direction and in line from the tool handle 205 where the users grip rests. This allows for measurement of g-forces and rotation in the tool 200 resulting in accurate data being generated to show usage statistics for the purposes of creating user and tool profiles.

FIG. 14 illustrates the tool monitor 210 attached to the tool chuck 201 such that the axis of the accelerometer within the tool monitor 210 is aligned with the rotating driving direction of the tool chuck 201. This allows for the measurement of g-forces, vibrations, and directional movement in the tool chuck 201 resulting from the spinning of the chuck and impact of the piece in the material.

The small design of the tool monitor requires minimal modification to cordless and corded tools and does not interfere with the normal use of these tools. Additionally, the tool monitor can include a ruggedized and waterproof structure for extended use in industrial environments. Furthermore, the wireless design of the tool monitor does not require the tool to be taken apart to collect and send the sensor data.

Figure 15:
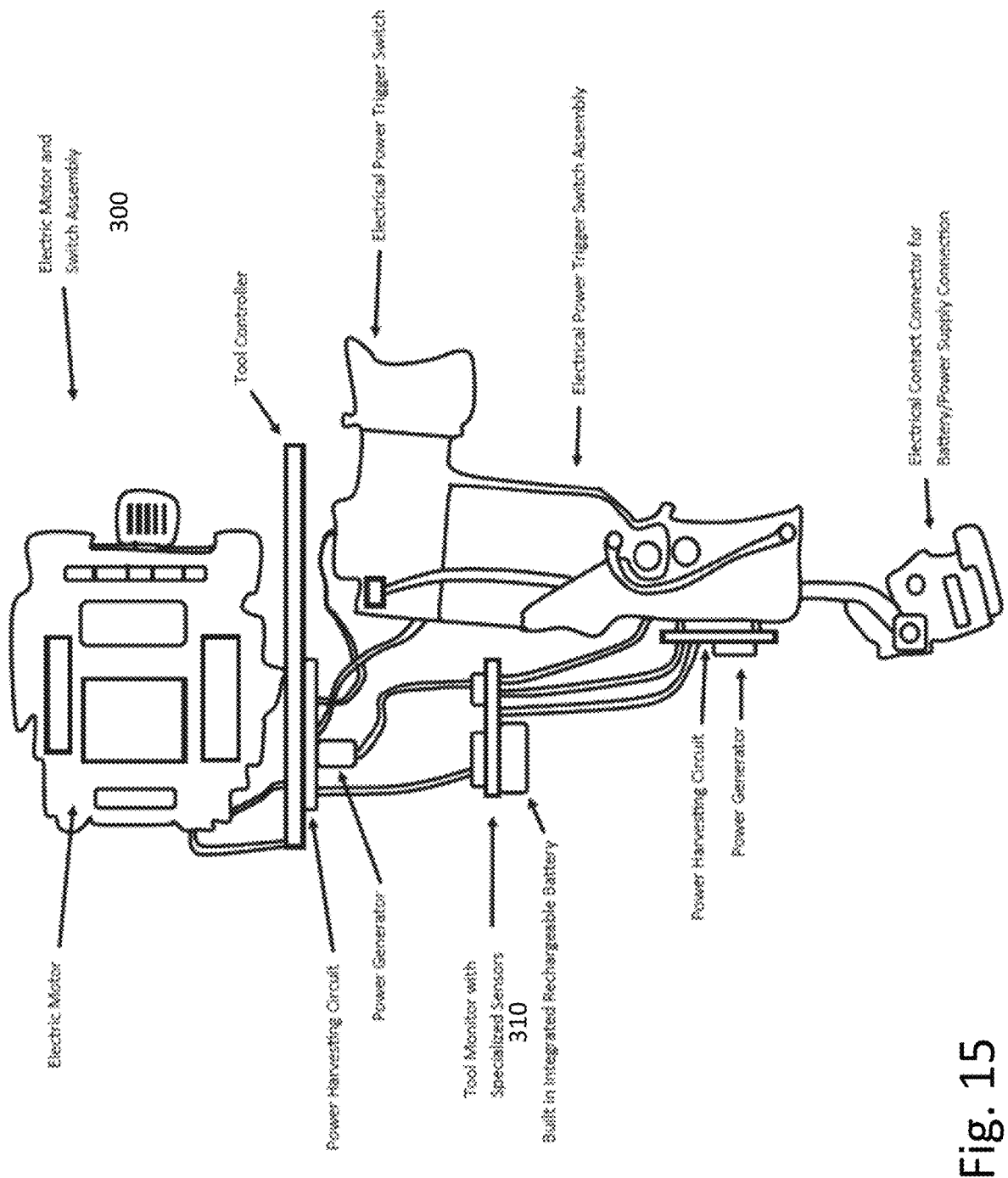
FIG. 15 is a drawing of a tool monitor placed on an electric motor and switch assembly according to an exemplary embodiment.
Figure 16:
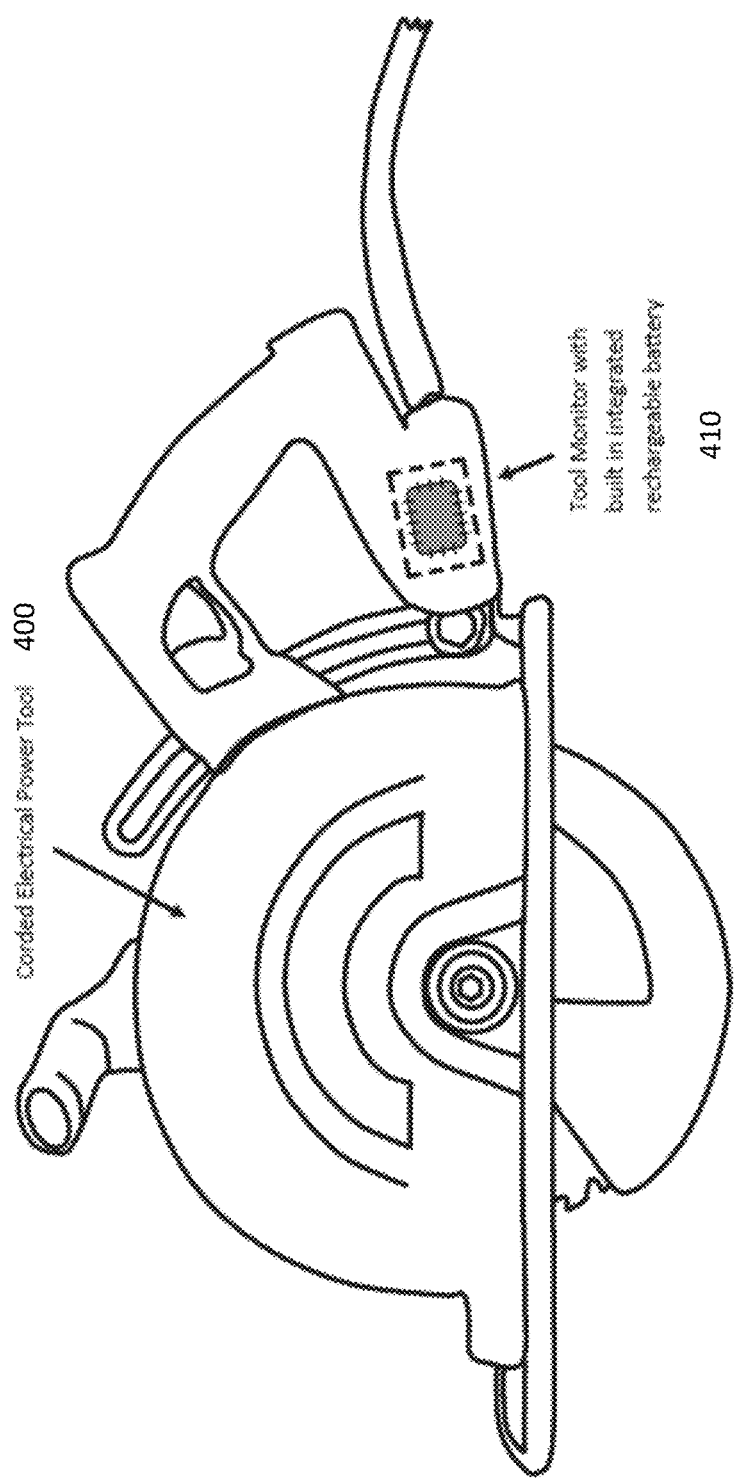
FIGS. 16-19 illustrate a tool monitor attached to different portions of a corded electrical power tool according to an exemplary embodiment.
Figure 17:
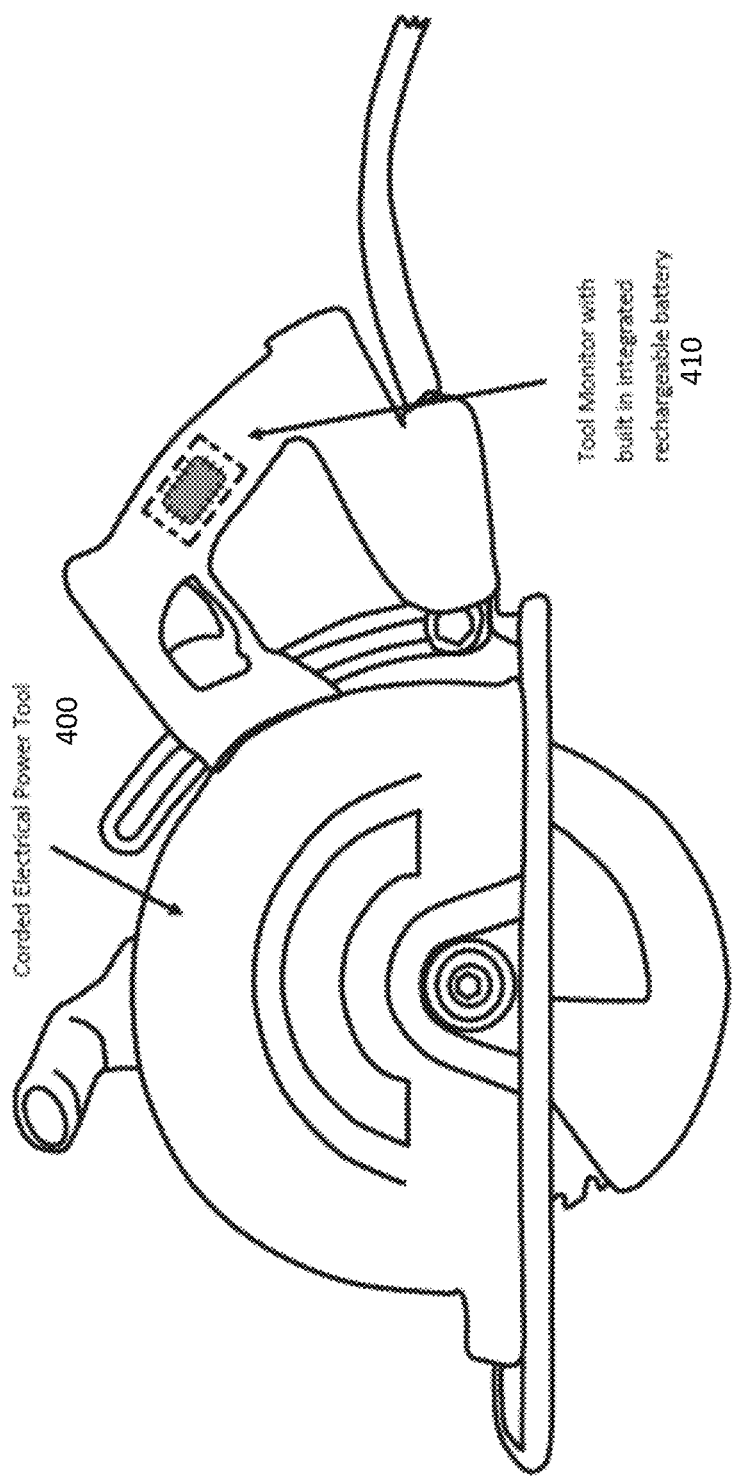

FIG. 15 is a drawing of a tool monitor 310 placed on an electric motor and switch assembly 300 according to an exemplary embodiment. As shown in FIG. 15, the tool monitor 310 can include one or more sensors and/or a sensor board, as well as a custom fitted sensor board housing. As shown in the figure, the tool monitor can be attached to the electric motor and switch assembly that allows for the powering and recharging of an integrated rechargeable battery, supercapacitor(s), and/or capacitor(s).

Figure 18:
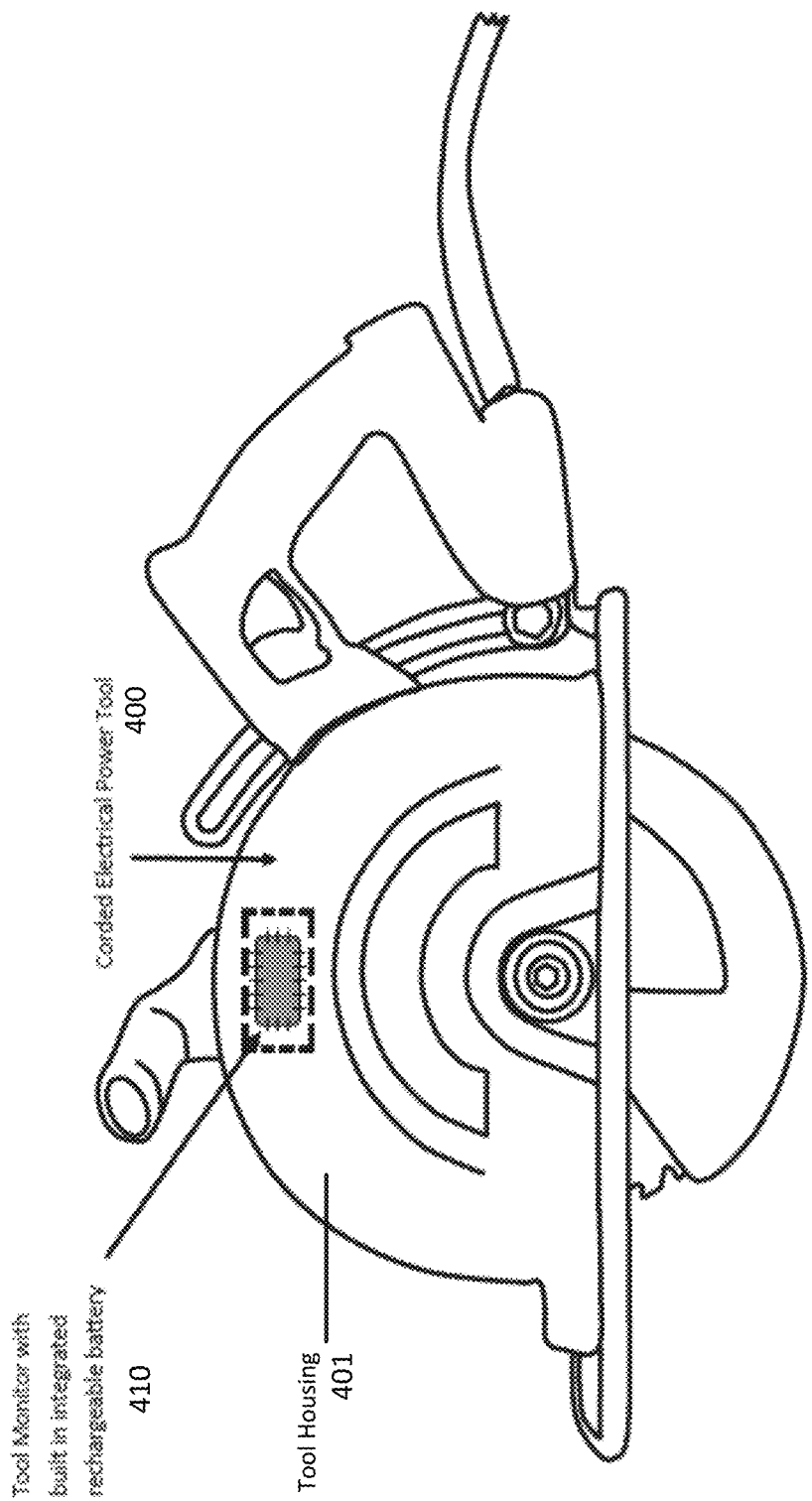
Figure 19:
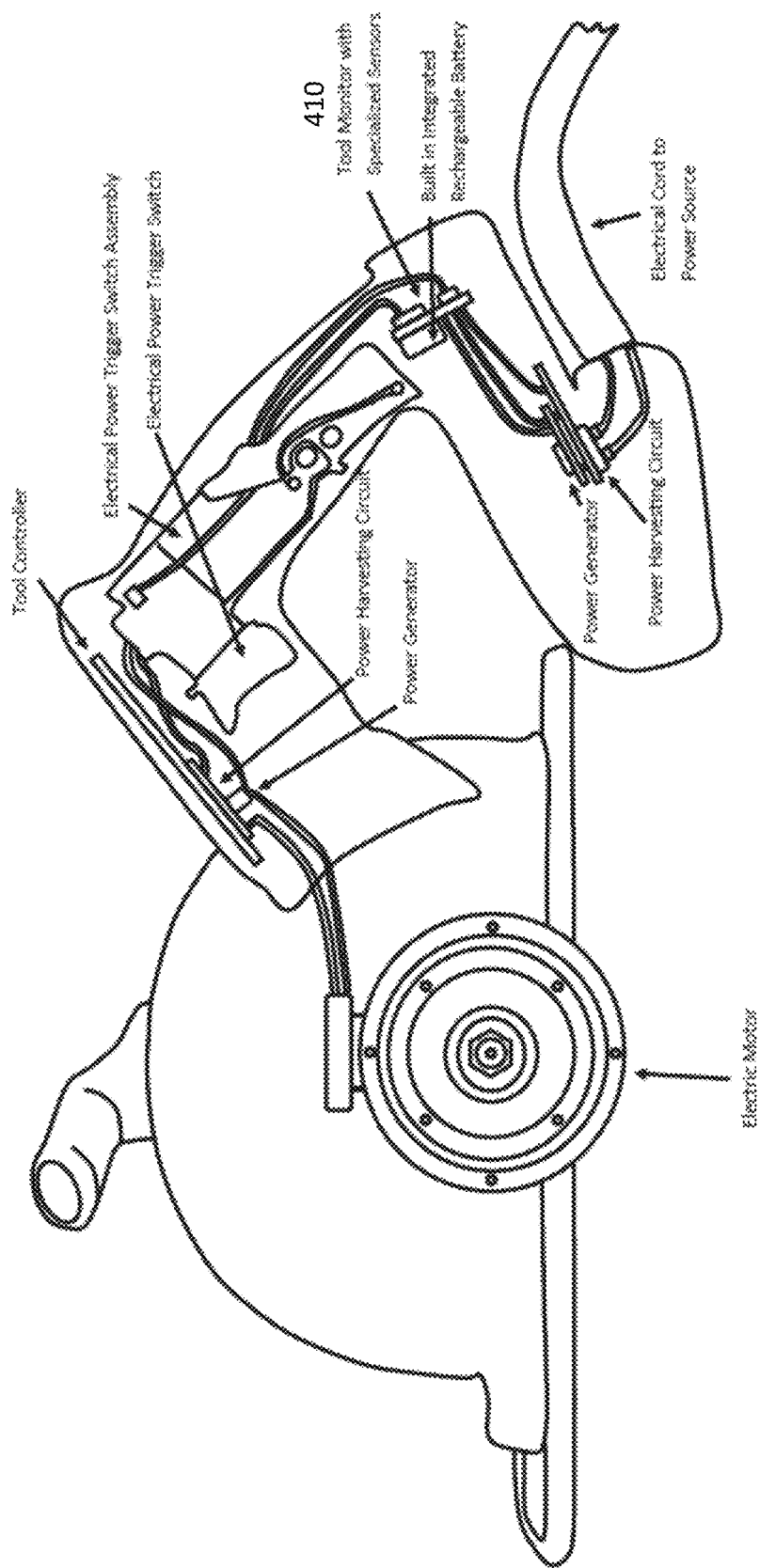

FIGS. 16-19 illustrate a tool monitor 410 attached to different portions of a corded electrical power tool 400 according to an exemplary embodiment. FIG. 18 illustrates the tool monitor 410 attached to the corded tool housing 401 such that the axis of the accelerometer within the tool monitor 410 is aligned with the direction of typical tool use within the tool housing 401. This allows measurement of the g-force generated in a particular orientation and direction when the tool is moved.

Figure 20:
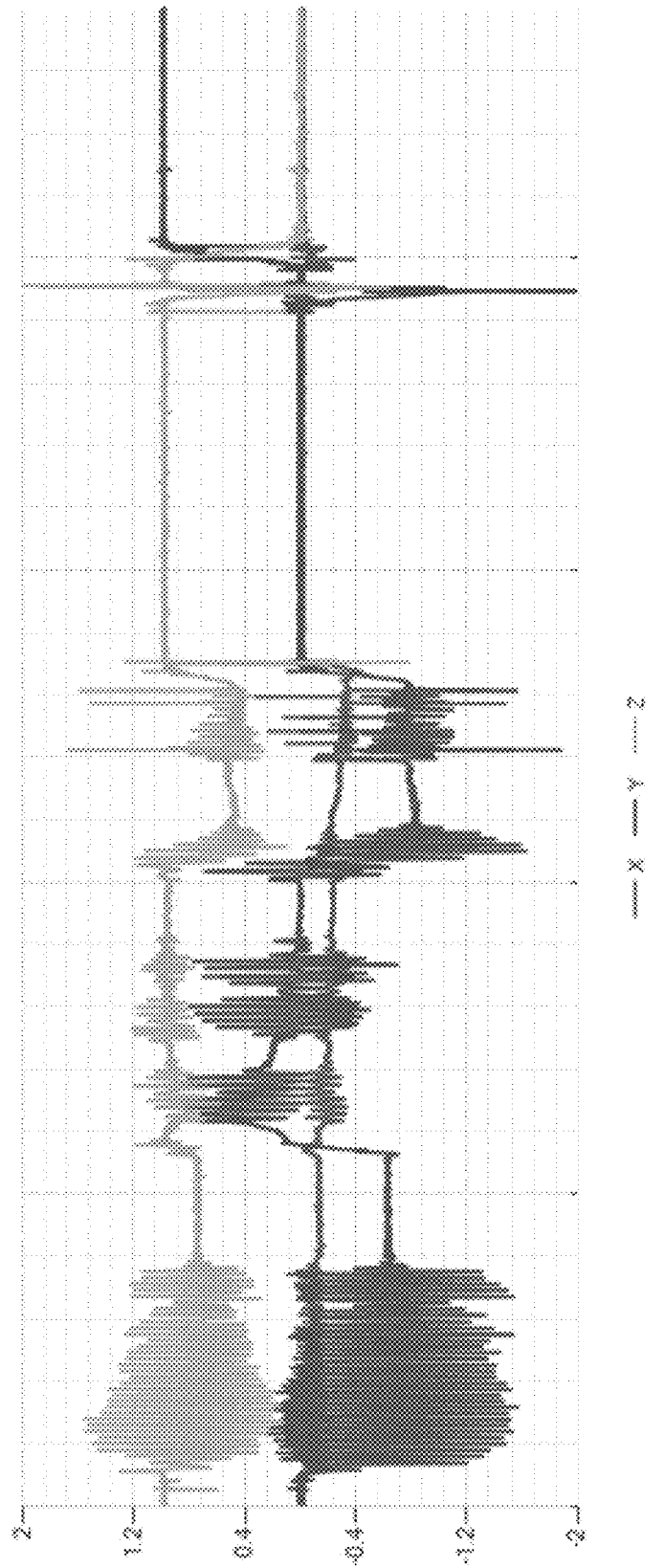
FIG. 20 illustrates an example of sensor data collected from an accelerometer over a time interval according to an exemplary embodiment.

The tool monitor compiles measurements of sensor data over a period of time of usage of the tool. As discussed earlier, the sensor data can include data from an accelerometer that measures g-forces at the particular location of the tool monitor. FIG. 20 illustrates an example of sensor data collected from an accelerometer over a time interval according to an exemplary embodiment. As shown in FIG. 20, the sensor data indicates the measured g-force along the X (blue line), Y (red line), and Z (orange line) axes over a time interval.

Figure 21:
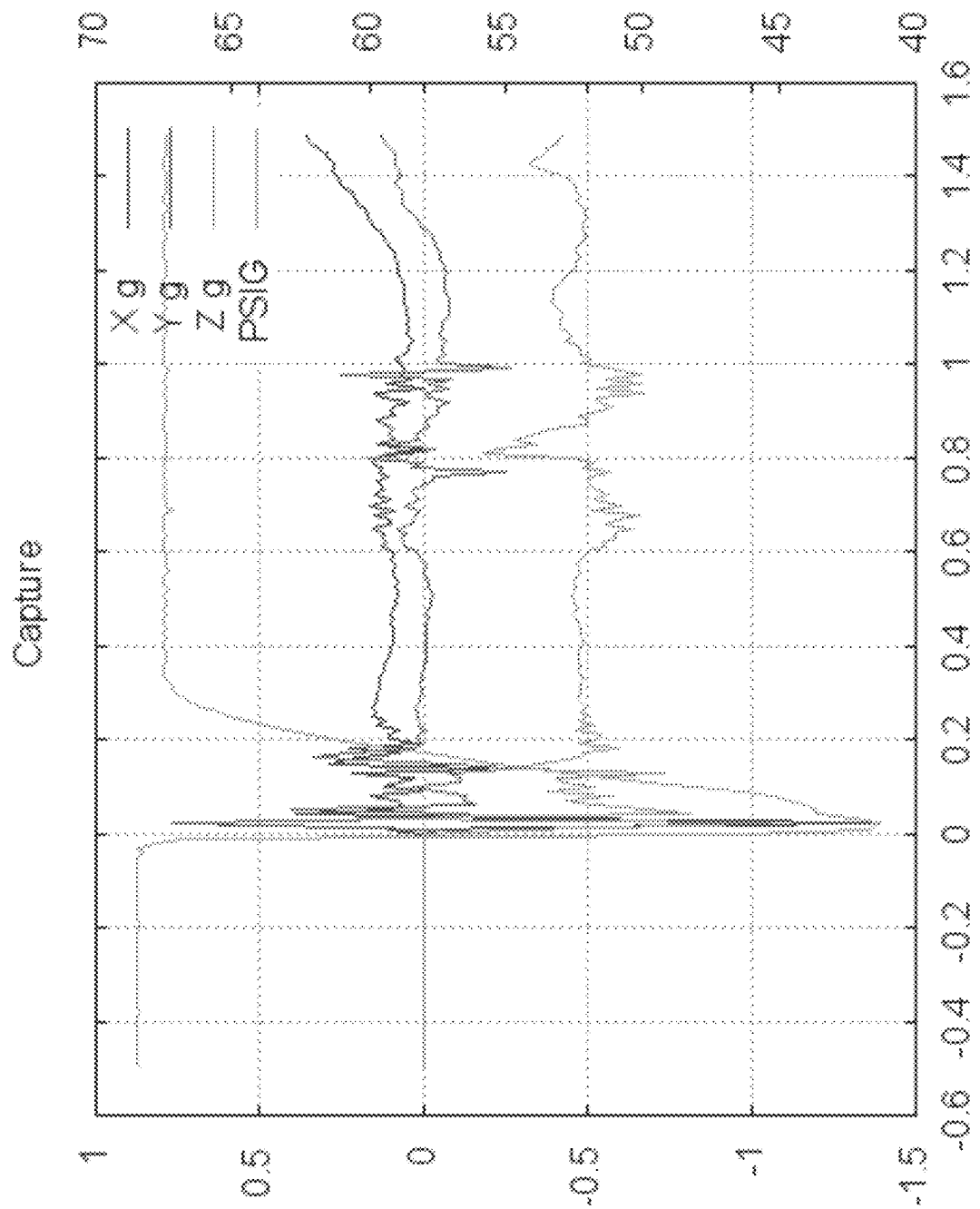
FIG. 21 illustrates an example of sensor data including g-force measured along the X (second line from top), Y (third line from top), and Z (bottom line) axes, as well as the pressure (top line) over a given time interval according to an exemplary embodiment.

The tool monitor additional includes one or more pressure sensors (such as barometric sensors) that can be used to measure the pressure at the location of the tool monitor at a given point in time. FIG. 21 illustrates an example of sensor data 2100 including g-force measured along the X (second line from top), Y (third line from top), and Z (bottom line) axes, as well as the pressure (top line) over a given time interval according to an exemplary embodiment. The left axis in the graph in FIG. 21 corresponds to measured G-forces (in units of gravitational acceleration), the bottom axis corresponds to the time (in seconds), and the right axis corresponds to the measured pressure (in pounds per square inch gauge). As shown in FIG. 21, the time axis begins at a negative value and proceeds through zero into a positive value. This negative time interval can correspond to a period prior to a particular event, such as the discharge of a projectile from the pneumatic tool or the activation of the pneumatic tool.

Figure 22:
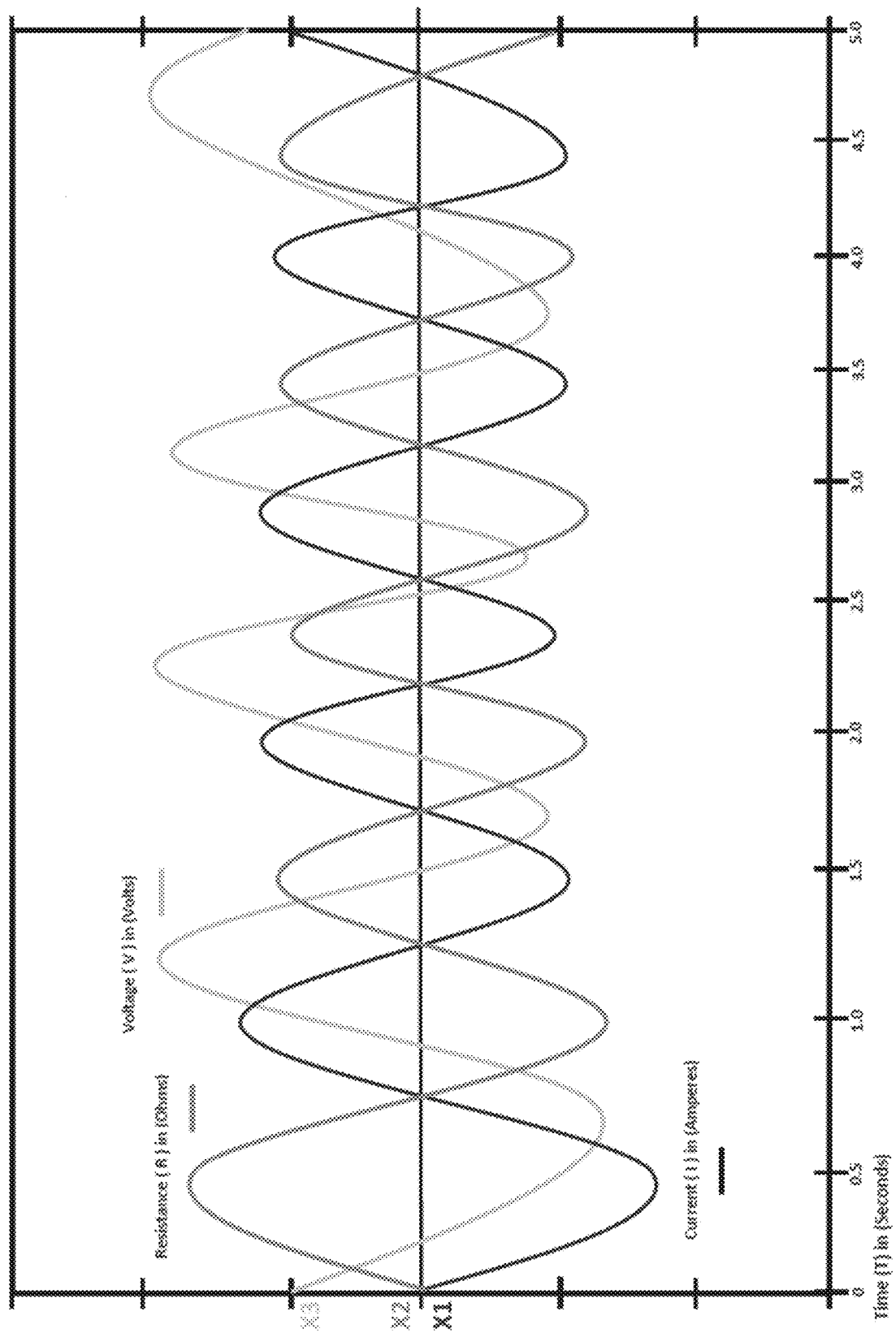
FIG. 22 illustrates an example of sensor data according to an exemplary embodiment.

The tool monitor can additionally includes one or more electronic and electrical signal sensors (such as electrical current sensors, hall effect sensors, etc.) that can be used to measure the electrical current, resistance, and voltage in multiple locations of the tool at a given point in time. FIG. 22 illustrates an example of sensor data according to an exemplary embodiment. FIG. 22 includes electrical current (line X1), electrical resistance (line X2), and electrical voltage (line X3), with the Y axes showing the current, resistance, and voltage changes over a given time interval. The left axis in the graph in FIG. 22 corresponds to measured current (in SI units of amperes), the bottom axis corresponds to the time (in seconds), and the right axis corresponds to the resistance (in SI units of ohms).

The measuring of these electrical units and passing of the data of these measurements directly to the cloud allow for the implementation of cloud based electronic and electrical visualization tools, such as ohmmeters, ammeters, and more, where individual tools have an electrical usage history stored.

Of course, the pressure, G-force sensor (sometimes referred to as an accelerometer), electrical sensor, and/or electronic sensor readings are provided by way of example only, and it is understood that the tool monitor can track a variety of different data points gathered by different sensors.

The tool monitor can optionally be configured to stay in a "hibernate" or sleep mode until certain actions are performed, after which the sensors are activated and record sensor data. For example, the tool monitor can be awakened when a shot is taken on a tool or a powering of the tool by a power signature and the tool monitor can then measure the pressure or the power signature at the time of wakeup and the pressure waveform or electrical waveforms over the firing or active powering period within the tool. After that shot or power sequence is finished, the tool monitor can either process, store, or transmit the data for further and/or later analysis and then return to a sleep mode.

The analytical software of the smart tool system (whether on the tool monitor and/or on a remote computing device) generates a data signature for the collected sensor data based upon the sensor waveforms (such as those shown in FIGS. 20-22) and then uses that data signature to perform diagnostic or other tool-related assessments. The generated data signature from a particular event (such as a firing or powering of the tool) can be compared with reference data signatures corresponding to known conditions, events, or usage scenarios to make assessments regarding the operation of the tool during the event. The reference data signatures can be determined based upon a training data set or calibration period and stored in memory for use in the diagnostic assessment of the tool usage. For example, a reference data signature can be stored which corresponds to improper operator grip when using the pneumatic tool. If the data signature generated from tool usage matches or falls within a predefined similarity threshold to the reference data signature, then a determination can be made that the operator of the tool is using an improper grip.

Reference data signatures can also be associated with particular time intervals. The accelerometers, pressure sensors, and electrical sensors within the tool monitor allow for measurement of gravitational forces, barometric pressure, and power usage by the tool monitor on the inside of the tool to identify specific effects and changes on parts, accessories, fasteners, and projectiles. The pressure and electrical signatures indicated by the waveform can be matched to signatures corresponding to different stages of operation of the tool in order that have known component pressure and/or electrical profiles to accurately identify the pressure and electrical usage on specific components at any given time.

The tool monitor additionally includes one or more location and coordinate generating sensors on it that can be used to identify tool locations at any given point in time.

The measuring of these location and coordinate points and passing of the data of these measurements and points to the cloud allow for the implementation of cloud based location services, such as active theft protection, loss prevention and management, tool lockout and arming features based on location, geolocation data services, geofence data gathering and data generation services, tool recovery services, and more.

There are a variety of possible assessments and determinations that can be made based upon the sensor data, data signatures generated from the data sensors, and/or reference data signatures. These include:

The automatic counting of projectiles fired and accessories and/or consumables used in the tools by comparing reference signatures corresponding to a projectile firing or accessory being used or electrical signal reports with generated data signatures from sensor data corresponding tool usage.

The use of sensor generated data to generate abuse reports on the tools.

The use of sensor generated data to generate and identify free-fall reports on the tools.

The use of sensor generated data to provide preventative maintenance information to the user.

The use of sensor generated data to provide predictive maintenance information to the user.

The use of sensor generated data to generate maintenance recommendations on the tools.

The use of sensor generated data to create intelligent customized maintenance programs for the tools.

The use of sensor generated data to create notifications, such as flashing custom sequences of small LED lights, on the tools or on the tool monitor.

The use of sensor generated data to create notifications delivered to a screen on the tool or on a display integrated into the tool monitor.

The use of sensor generated data to identify user type for the purpose of switching applications and information provided.

The use of sensor generated data in applied machine learning to further extend user benefits in the tools.

The use of sensor generated data in machine learning to further extend user benefits in the tools.

The use of sensor generated data for the sending of alerts to warn of parts at risk of failure.

The use of sensor generated data for active warranty management.

The use of sensor generated data for generating promotions based on tool accessory, projectile, and consumable usage.

The use of sensor generated data to identify projectile type and/or accessory type and/or consumable type being used.

The use of sensor generated data to identify when the tool is fired and/or used without a projectile, or operated without the appropriate accessory, or with the appropriate consumable, such as a saw blade, grinding wheel, drill bit, screws, etc.

The use of sensor generated data to identify material type being fastened cut, or worked into and onto.

The use of sensor generated data to combine fastener, accessory, consumable, and material identification data points to send customized recommendations of projectiles, accessories, consumables, and materials to the user.

The use of sensor generated data to identify material installation uses and procedures.

The use of sensor generated data to take data points on material installation uses and procedures and generate alerts or recommendations to the user.

The use of sensor generated data to generate specialized custom training services and information to the user.

The use of sensor generated data to generate and/or recommend or develop advanced safety standards and procedures for the protection of the user.

The use of sensor generated data to generate statistics for review and analysis on the tool.

The use of sensor generated data on the gravitational forces reported by the apparatus to generate abuse reports for the tools.

The use of sensor generated data of the reported gravitational forces to identify the type and size of fastener used in the tool.

The use of sensor generated data to identify types and sizes of fasteners used and/or accessories and/or consumables used in the tools.

The use of sensor generated data to generate statistics for review and analysis on the tools.

The use of sensor generated data on the gravitational forces reported by the apparatus to generate abuse reports for the tools.

The use of sensor generated data of the reported g-forces to identify the type and size of fastener and/or accessories and/or consumables used in the tool.

The use of sensor generated data to identify types and sizes of fasteners and/or accessories and/or consumables used in the tools.

The use of sensor generated data including the wave forms generated by the pressure sensors, barometric sensors, electronic sensors, and electrical sensors to locate and identify individual part failures within the pneumatic tools.

The use of sensor generated data including GPS coordinates and other location data generated by the device to identify tool location on a map or device.

The use of sensor generated data on location and coordinates to deliver theft protection features.

The use of sensor generated data on location and coordinates to deliver loss prevention features.

The use of sensor generated data on location and coordinates to arm and disarm cordless and/or corded tools.

The use of sensor generated data on location and coordinates to deliver notifications to user of the tool location and usage at that location.

The use of sensor generated data on location and coordinates to deliver notifications to third parties for the purposes of tool recovery.

The use of sensor generated data on location and coordinates to lock and/or lockout a tool from working if it has been stolen, gone missing, or is in an unapproved location.

Figure 23:
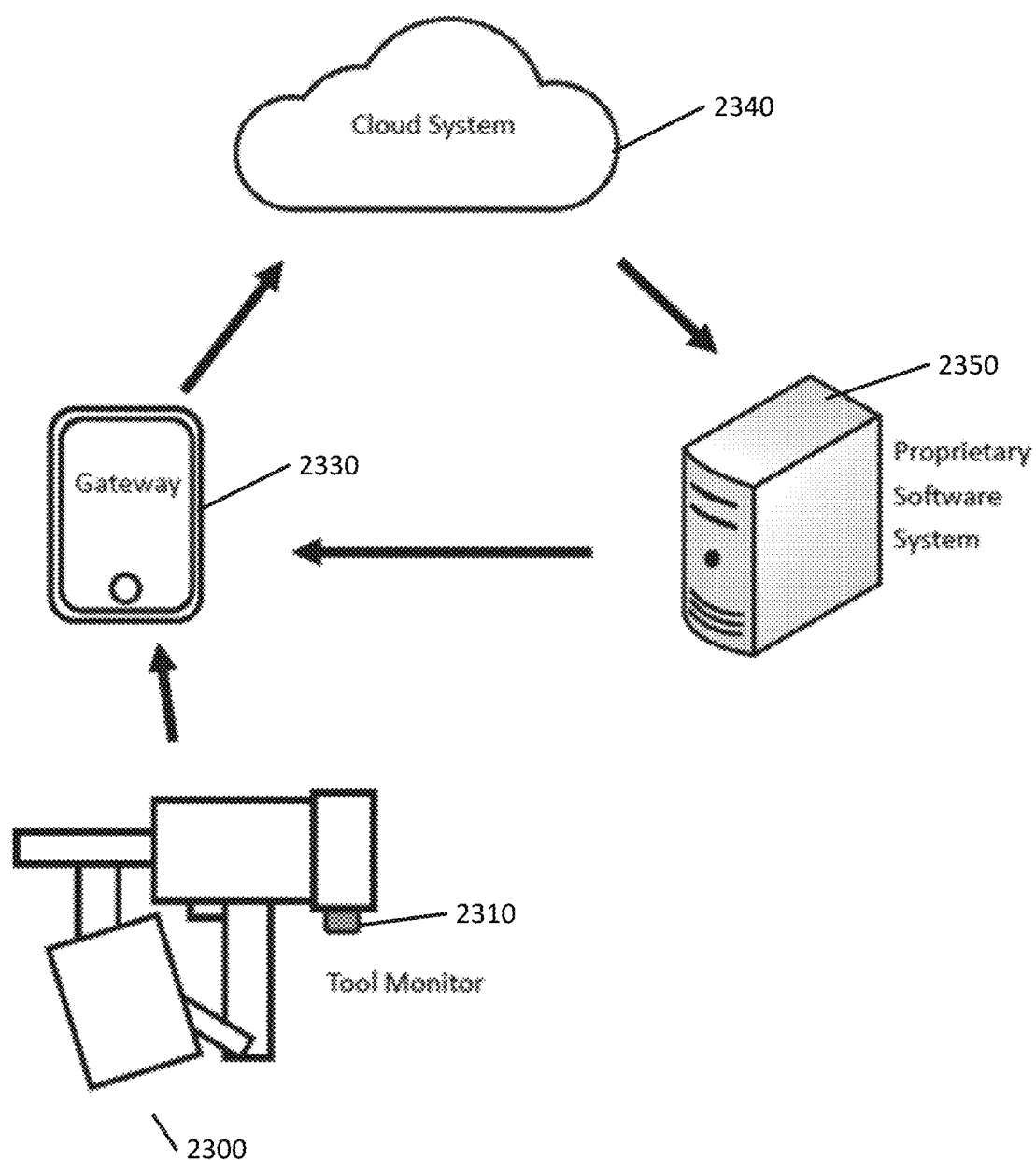
FIG. 23 illustrates an implementation of the communications architecture of the smart tool system according to an exemplary embodiment.

FIG. 23 illustrates an implementation of the communications architecture of the smart tool system according to an exemplary embodiment. The tool monitor 2310 can gather data on the monitored tool 2300 and pass the information at predetermined or custom intervals through a gateway 2330 to the cloud 2340. Data can then be pulled from the cloud and then processed by a specialized software and hardware system 2350 executing the analytical software which then deliver specialized information to a device of the end user which could be, but is not limited to a mobile device, a tablet, a personal laptop or computer, an on-tool screen, or any device configured to receive the specialized information. In the example shown in FIG. 23, the end-user device 2330 is also the gateway 2330.

Figure 24:
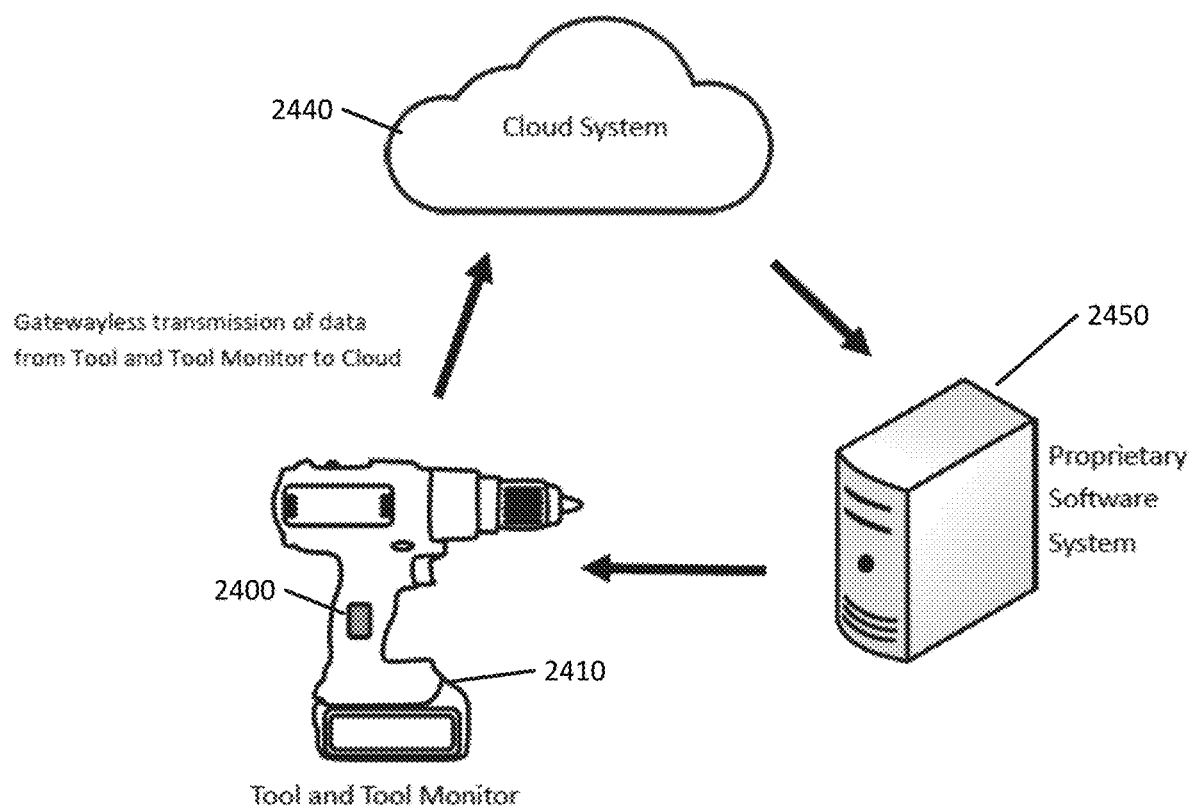
FIG. 24 illustrates another implementation of the communications architecture of the smart tool system according to an exemplary embodiment.

FIG. 24 illustrates another implementation of the communications architecture of the smart tool system according to an exemplary embodiment. The tool monitor 2410 can gather data on the monitored tool 2400 and pass the information at predetermined or custom intervals directly to the cloud system 2440. Data can then be pulled from the cloud 2440 and then processed by a specialized software and hardware system 2450 executing the analytical software which can then deliver specialized information to a device of the end user and/or the tool monitor 2410 directly. The specialized system 2450 can process the sensor data received from monitor 2410 along with the signature profiles and other information stored on the cloud system 2440 to perform any of the diagnostic or review assessments described herein. The results of these assessments can then be relayed to an end-user of the tool 2400 and/or collected for the purposes of feedback, testing, and/or development.

A gateway as shown in the communications architecture of FIG. 23 is typically a Bluetooth-enabled, RFID-enabled, or other communications technology that requires a gateway connection and interface to communicate with prior to sending data. This involves requiring a user to install an application on a mobile device or computer, placing a local router or independent antenna device on site and in range of the sensor technology, or the use of an activation unit in a particular local area independent and separate from the device on the tool monitor for activating the technology on board the tool monitor for the purposes of acquiring and sending the data to the cloud. These requirements for a gateway devices and user activation create hurdles for adoption, consistent use, and limits access to data. The gateway requirements can prevent data and information on tools from being sent to the cloud because of low user adoption, or low usage of the gateway technology, or because tools with these gateway dependent devices on them move out of the effective range of the gateway.

The system shown in FIG. 24 has the advantage of sending the data collected by the tool monitor 2410 directly to the cloud system without requiring the user to set up or utilize any kind of gateway. This can be accomplished, for example, by using a wireless telecommunications card (such as a sim card) within the tool monitor 2410 to establish a communications connection and send the information.

There are several benefits to the disclosed smart tool system. There is currently no way to accurately measure, and report to the cloud those measurements of cycles of mechanical actions, electrical actions, electronic actions, or g-forces applied to specific individual tools and specific individual parts in daily normal use situations. A single cycle in a pneumatic tool occurs, but is not limited to occurring upon depression of the trigger of the tool which completes an electronic and/or electrical signal, which completes a circuit of the tool that drives a motor multiple rotations, which itself drives or powers the motion of a fastener, accessory, and/or consumable. The disclosed smart tool system allows for deep data acquisition on many parts of the product which in turn help deliver greater benefits to users, sellers, distributors, brands, brand houses, and manufactures of said tools. Some of the different benefits are/but are not limited to training, maintenance management, warranty management, inventory management, product development, product delivery, safety standards generation, and more. The tool monitor can logs, stores, and sends single points and multiple points of data when the tool undergoes each single cycle of use and at specified intervals.

When a user has a non-electric or non-electronic compressor dependent compression driven tool, adding this monitor to the product adds multiple benefits for the user. It adds multiple functionalities to the tool which includes but is not limited to being able to know the exact amount of fasteners that are shot or driven, tracking fastener placement and usage details, identifying fastener and material types being shot or shot into, being able to know the exact amount of accessories that are being consumed or used, being able to identify the lifespan of different accessories and parts, tracking accessory replacement and usage details, being able to receive alerts for preventative maintenance, locating specific tools, providing warranty management, introducing and developing specialized safety training and safety standards based on users use of said tool, and more.

Having a smart tool monitor system can help reduce downtime, help maintenance schedules, decrease repair costs, improve product development, help increase user safety, help develop better safety standards, prevent tool loss, create active theft protection services, implement tool lockout and locking, implement arming and disarming of tools, enable audio alarming of individual tools, and more. It also helps deliver accurate data to bring multiple benefits to users, end users, manufacturers, brands and houses of brands, retailers, online sellers and resellers, and distributors and wholesalers of this type of product. It may be used to help these types of users support the tools and offer other benefits not currently available for tools.

The tool monitor apparatus and the sensor generated data it produces and delivers offers the ability to increase safety and safety awareness to the users and producers of the product. Because it delivers real world and real time data, it can deliver warnings of misuse on the tools and help users reduce their risk by teaching and training them in the appropriate and recommended use of the tools. For producers, the data helps them develop safer, more reliable products. This also helps generate data for the forming of new and improved safety standards for the different safety bodies and regulatory agencies.

Because the tool monitor apparatus and the sensor generated data delivers real world and real time data, it can deliver reports on the health effects of using the tools. It can report on the g-forces the user experiences and help them reduce those g-forces through different recommendations. It can report on and send warnings about the way the user holds the tools, to help reduce injury and fatigue.

The tool monitor apparatus and the sensor generated data it produces and delivers offers the ability to user of the tool to produce higher quality and safer products, crafts, and jobs by generating material installation quality reports.

Because it uses real time and real-world data, it can generate and deliver videos, recommendations, blogs, texts, and more to each individual user based on their usage profiles generated by the data. Additionally, because it uses real time and real-world data, it can help users to manage their inventory and track stolen property, including but not limited to tools, parts, accessories, and fasteners.

Figure 25:
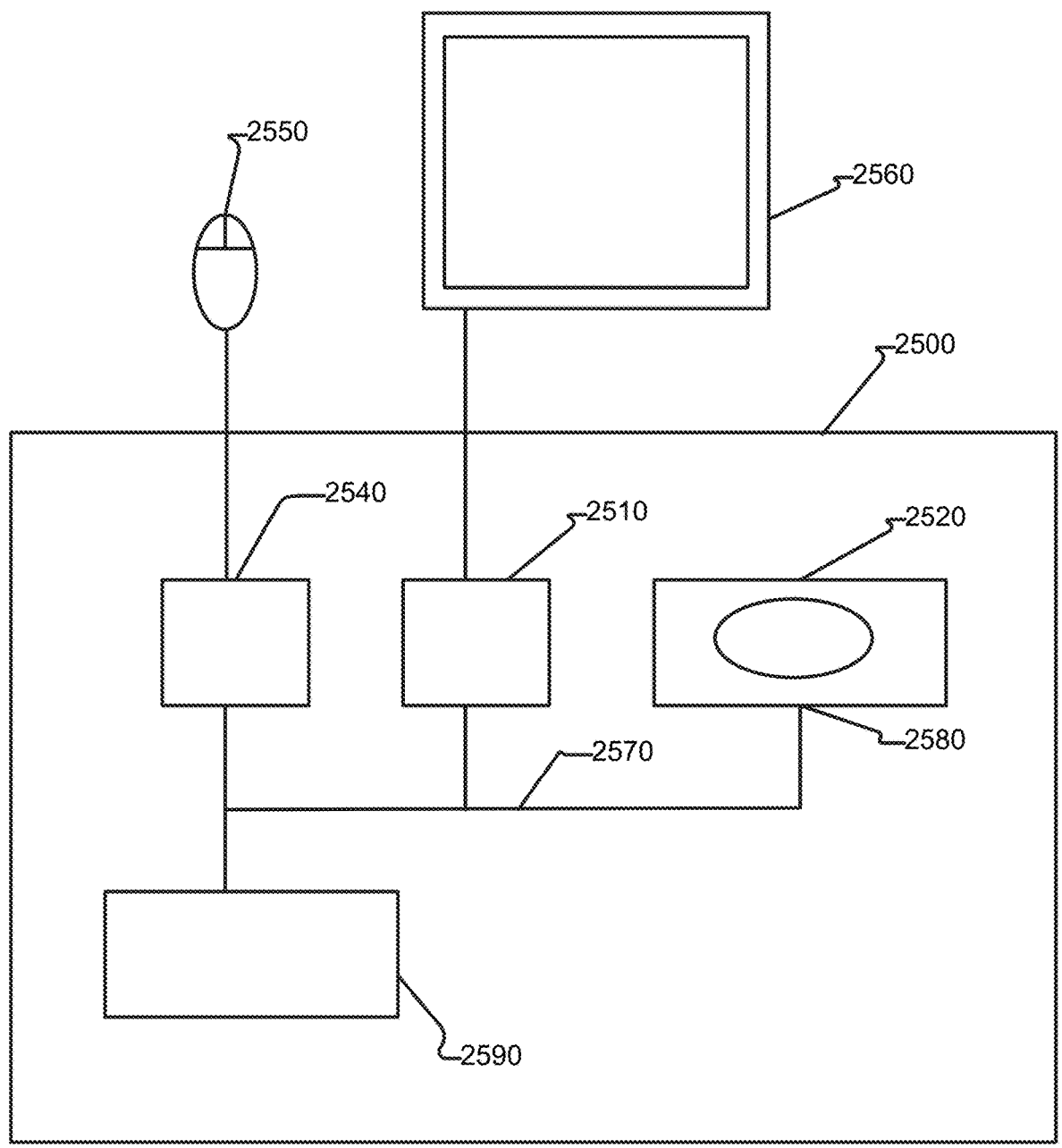
FIG. 25 illustrates an exemplary specialized computing environment used with the tool monitor and associated methods.

One or more of the above-described techniques can be implemented in or involve one or more special-purpose computer systems having computer-readable instructions loaded thereon that enable the computer system to implement the above-described techniques. FIG. 25 illustrates an example of a computing environment 2500. The computing environment 2500 is not intended to suggest any limitation as to scope of use or functionality of a described embodiment(s) and can correspond to, for example, a tool monitor device, a cloud system, a gateway device, a specialized proprietary computing system for performing analysis of sensor data signatures, etc.

With reference to FIG. 25, the computing environment 2500 includes at least one processing unit 2510 and memory 2520. The processing unit 2510 executes computer-executable instructions and can be a real or a virtual processor. In a multi-processing system, multiple processing units execute computer-executable instructions to increase processing power. The memory 2520 can be volatile memory (e.g., registers, cache, RAM), non-volatile memory (e.g., ROM, EEPROM, flash memory, etc.), or some combination of the two. The memory 2520 can store software 2580 implementing described techniques.

A computing environment can have additional features. For example, the computing environment 2500 includes storage 2540, one or more input devices 2550, one or more output devices 2560, and one or more communication connections 2590. An interconnection mechanism 2570, such as a bus, controller, or network interconnects the components of the computing environment 2500. Typically, operating system software or firmware (not shown) provides an operating environment for other software executing in the computing environment 2500, and coordinates activities of the components of the computing environment 2500.

The storage 2540 can be removable or non-removable, and includes magnetic disks, magnetic tapes or cassettes, CD-ROMs, CD-RWs, DVDs, or any other medium which can be used to store information and which can be accessed within the computing environment 2500. The storage 2540 can store instructions for the software 2580.

The input device(s) 2550 can be a touch input device such as a keyboard, mouse, pen, trackball, touch screen, or game controller, a voice input device, a scanning device, a digital camera, remote control, or another device that provides input to the computing environment 2500. The output device(s) 2560 can be a display, television, monitor, printer, speaker, or another device that provides output from the computing environment 2500.

The communication connection(s) 2590 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the context of computer-readable media. Computer-readable media are any available media that can be accessed within a computing environment. By way of example, and not limitation, within the computing environment 2500, computer-readable media include memory 2520, storage 2540, communication media, and combinations of any of the above.

Of course, FIG. 25 illustrates computing environment 2500, display device 2560, and input device 2550 as separate devices for ease of identification only. Computing environment 2500, display device 2560, and input device 2550 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 2500 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. An external pneumatic tool monitoring device configured to be positioned on an exterior of a pneumatic tool, the external pneumatic tool monitoring device comprising:
an external pneumatic tool monitoring device housing configured to couple with an exterior surface of the pneumatic tool at a plurality of attachment points on the exterior surface of the pneumatic tool;
one or more controllers positioned within the external pneumatic tool monitoring device housing and configured to transition the external pneumatic tool monitoring device from a hibernate mode to a wake mode in response to detecting operation of the pneumatic tool;
one or more sensors including a pressure sensor and an accelerometer positioned within the external pneumatic tool monitoring device housing and configured to measure properties of the pneumatic tool over a period of time, the properties comprising pressure and acceleration of the pneumatic tool at an attachment point in the plurality of attachment points, wherein at least one of the one or more sensors is activated when the external pneumatic tool monitoring device is in the wake mode and deactivated when the external pneumatic tool monitoring device is in the hibernate mode;
a communication interface positioned within the external pneumatic tool monitoring device housing and configured to transmit data from the external pneumatic tool monitoring device to one or more external devices, the transmitted data being generated based at least in part on the measured one or more properties of the pneumatic tool over the period of time; and
a power source positioned within the external pneumatic tool monitoring device housing and configured to provide power to the one or more sensors and the communication interface.

2. The external pneumatic tool monitoring device of claim 1, wherein the power source is configured to provide power to the one or more sensors and the communication interface when the when the external pneumatic tool monitoring device is in the wake mode and to withhold power from one or more of at least one of the one or more sensors or the communication interface when the external pneumatic tool monitoring device is in the hibernate mode.

3. The external pneumatic tool monitoring device of claim 1, wherein at least one sensor in the one or more sensors comprises a wake sensor and wherein operation of the pneumatic tool is detected based on measurements of the wake sensor.

4. The external pneumatic tool monitoring device of claim 1, wherein the housing is configured to removably couple with the exterior surface of the pneumatic tool at the plurality of attachment points.

5. The external pneumatic tool monitoring device of claim 1, wherein each of the one or more properties of the pneumatic tool comprises either an electromagnetic property or a physical property.

6. The external pneumatic tool monitoring device of claim 1, wherein the one or more controllers are further configured to:
generate one or more data signatures based at least in part on the one or more measured properties.

7. The external pneumatic tool monitoring device of claim 6, wherein the one or more controllers are further configured to:
compare at least one generated data signature in the one or more generated data signatures to one or more stored data signatures; and
generate a diagnostic assessment based at least in part on the comparison.

8. The external pneumatic tool monitoring device of claim 6, wherein the one or more controllers are further configured to:
transmit location data indicating a location of attachment of the external tool monitoring device on the pneumatic tool.

9. The external pneumatic tool monitoring device of claim 1, wherein the one or more sensors further comprise one or more of: an audio sensor, an inertial measurement unit (IMU) sensor, a barometric sensor, an electrical current sensor, a voltage sensor, a hall effect sensor, an electromagnetic sensor, or a temperature sensor.

10. The external pneumatic tool monitoring device of claim 1, wherein the one or more external devices comprise one or more cloud servers.

11. The external pneumatic tool monitoring device of claim 10, wherein the communication interface comprises a cellular communications interface and wherein the communication interface configured to transmit data from the external tool monitoring device directly to the one or more cloud servers.

12. The external pneumatic tool monitoring device of claim 10, wherein the communication interface comprises one of a wireless interface, and infrared interface, a Bluetooth interface, a near-field communications interface, or a radio frequency interface and wherein the communication interface is configured to transmit data from the external pneumatic tool monitoring device to the one or more cloud servers via a gateway device disposed between the external pneumatic tool monitoring device and the one or more cloud servers.

13. The external pneumatic tool monitoring device of claim 1, wherein the one or more controllers are configured to transition the external pneumatic tool monitoring device from the wake mode into the hibernate mode based at least in part on inactivity of at least one of the one or more sensors.

* * * * *